United States Patent
Srinivasan et al.

(10) Patent No.: US 11,948,117 B2
(45) Date of Patent: Apr. 2, 2024

(54) METHOD AND SYSTEM FOR MACHINE LEARNING BASED SERVICE PERFORMANCE INTELLIGENCE

(71) Applicant: Accenture Global Solutions Limited, Dublin (IE)

(72) Inventors: Madhan Kumar Srinivasan, Bengaluru (IN); Samba Sivachari Rage, Bengaluru (IN); Ashish Pant, Bangalore (IN); Abdul Hammed Shaik, Hyderabad (IN); Arun Krishnamurthy, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 323 days.

(21) Appl. No.: 17/410,764

(22) Filed: Aug. 24, 2021

(65) Prior Publication Data
US 2023/0079124 A1 Mar. 16, 2023

(51) Int. Cl.
*G06Q 10/0639* (2023.01)
*G06N 3/088* (2023.01)
(Continued)

(52) U.S. Cl.
CPC ....... *G06Q 10/06393* (2013.01); *G06N 3/088* (2013.01); *G06Q 10/20* (2013.01); *G06Q 30/0201* (2013.01); *G06Q 30/0282* (2013.01)

(58) Field of Classification Search
None
See application file for complete search history.

(56) References Cited

U.S. PATENT DOCUMENTS

| 10,990,760 B1 * | 4/2021 | Monnett | G06F 40/295 |
| 2007/0050256 A1 * | 3/2007 | Walker | G06Q 30/0261 |
| | | | 705/14.27 |

(Continued)

OTHER PUBLICATIONS

Ratiranjan Jena et al., *International Journal of Disaster Risk Reduction*, Abstract of "Integrated ANN-cross-validation and AHP-TOPSIS model to improve earthquake risk", assessmenthttps://www.researchgate.net/publication/342713827_Integrated_ANN-cross-validation_and_AHP-TOPSIS_model_to_improve_earthquake_risk_assessment, Jul. 2020 (2 pages).

(Continued)

*Primary Examiner* — Susanna M. Diaz
(74) *Attorney, Agent, or Firm* — Crowell & Moring LLP

(57) ABSTRACT

A method and system for cloud based service provider performance evaluation are disclosed. The method may include extracting service record data and ticket status change record data from the service ticket data and aggregating the service record data and the ticket status change record data. The method may include calculating ticket level performance metric data based on the aggregated record data and generating ticket level performance scores based on the ticket level performance metric data. The method may further include generating service level performance scores based on the service level performance metric data and generating service feedback performance scores based on the service feedback metric data. The method may further include merging the ticket level performance scores, the service level performance scores, and the service feedback performance scores to generate performance vectors and evaluating overall performances of the service providers based on the set of performance vectors.

17 Claims, 14 Drawing Sheets

(51) Int. Cl.
 *G06Q 10/20* (2023.01)
 *G06Q 30/0201* (2023.01)
 *G06Q 30/0282* (2023.01)

(56) References Cited

U.S. PATENT DOCUMENTS

| | | | | |
|---|---|---|---|---|
| 2014/0039958 | A1* | 2/2014 | Bivens | G06Q 10/06 705/7.15 |
| 2018/0316695 | A1* | 11/2018 | Esman | H04L 63/1433 |
| 2018/0375999 | A1* | 12/2018 | Molander | H04M 3/5133 |
| 2021/0004706 | A1* | 1/2021 | Riddle | G06Q 10/10 |
| 2021/0081873 | A1* | 3/2021 | Geffen | G06Q 10/06398 |
| 2021/0406832 | A1* | 12/2021 | Tennur Narayanan | G06F 11/302 |
| 2022/0164347 | A1* | 5/2022 | Akyamac | G06N 5/025 |

OTHER PUBLICATIONS

Kabir, Golam, et al., *Int'l Journal of Industrial and Systems Engineering*, "Multi-criteria inventory classification through integration of fuzzy analytic hierarchy process and artificial neural network", 14(1):74-103, Research Gate, https://www.researchgate.net/publication/264837537, Jan. 2013, 31 pages.

Seifollahi, N., et al, "Artificial Neural Network and Analytical Hierarchy Process Integration: A tool to estimate the success of knowledge management implementation", https://www.academia.edu/5291937/Artificial Neural Network and Analytical Hierarchy Process Integration A Tool to Estimate the Success of Knowledge Management Implementation, 15 pages (2012).

Mocenni, Chiara, The Analytic Hierarchy Process, https://www3.diism.unisi.it/~mocenni/Note AHP.pdf, 6 pages (available Feb. 13, 2020).

* cited by examiner

METHOD AND SYSTEM FOR MACHINE LEARNING BASED SERVICE PERFORMANCE INTELLIGENCE

TECHNICAL FIELD

This disclosure relates to machine learning applications, in particular, to evaluating performance of service providers based on machine learning models.

BACKGROUND

Most industries are investing a majority of their resources into identifying, evaluating, and sourcing the right information technology (IT) partners. In today's digital world where the platforms are increasingly moving towards catering to the "Digital Customers," the choice of IT partners has a direct bearing on the organization's ability to successfully deliver high quality of service to the end customer. The existing service provider performance evaluation follows a rigorous and structured approach based on exhaustive surveys performed in the industry. Such service provider performance evaluation can be improved to reduce manual inputs, costs, inefficiencies, errors, and inconsistencies to achieve more accurate decision making.

SUMMARY

This disclosure relates to systems and methods for evaluating performance of service providers based on machine learning models.

In one embodiment, a method for evaluating performance of service providers is disclosed. The method may include obtaining service ticket data for service tickets processed by a plurality of service providers. Each of the plurality of service providers may include one or more service units. A service ticket may be transferred between service units of the plurality of service providers. The method may further include extracting service unit record data for each service unit and ticket status change record data from the service ticket data and aggregating the service unit record data and the ticket status change record data based on timing of transferring the service ticket between the service units. The method may further include calculating ticket level performance metric data for the plurality of service providers based on the aggregated record data and generating ticket level performance scores for the plurality of service providers based on the ticket level performance metric data. The method may further include obtaining service level performance metric data for the plurality of service providers and generating service level performance scores for the plurality of service providers based on the service level performance metric data. The method may further include obtaining service feedback performance metric data for the plurality of service providers and generating service feedback performance scores for the plurality of service providers based on the service feedback metric data.

The method may further include merging the ticket level performance metric data, the ticket level performance scores, the service level performance metric data, the service level performance scores, the service feedback performance metric data and the service feedback performance scores to generate a set of performance vectors. The method may further include evaluating, with a machine learning model, overall performance of the plurality of service providers based on the set of performance vectors.

In another embodiment, a system for evaluating performance of service providers is disclosed. The system may include a memory having stored thereon executable instructions and a processor in communication with the memory. When executing the instructions, the processor may be configured to obtain service ticket data for service tickets processed by a plurality of service providers. Each of the plurality of service providers may include one or more service units. A service ticket may be transferred between service units of the plurality of service providers. The processor may be further configured to extract service unit record data for each service unit and ticket status change record data from the service ticket data and aggregate the service unit record data and the ticket status change record data based on timing of transferring the service ticket between the service units. The processor may be further configured to calculate ticket level performance metric data for the plurality of service providers based on the aggregated record data and generate ticket level performance scores for the plurality of service providers based on the ticket level performance metric data. The processor may be further configured to obtain service level performance metric data for the plurality of service providers and generate service level performance scores for the plurality of service providers based on the service level performance metric data. The processor may be further configured to obtain service feedback performance metric data for the plurality of service providers and generate service feedback performance scores for the plurality of service providers based on the service feedback metric data.

The processor may be further configured to merge the ticket level performance metric data, the ticket level performance scores, the service level performance metric data, the service level performance scores, the service feedback performance metric data and the service feedback performance scores to generate a set of performance vectors. The processor may be further configured to evaluate, with a machine learning model, overall performance of the plurality of service providers based on the set of performance vectors.

In another embodiment, a product for evaluating performance of service providers is disclosed. The product may include machine-readable media other than a transitory signal and instructions stored on the machine-readable media. When being executed, the instructions may be configured to cause a processor to obtain service ticket data for service tickets processed by a plurality of service providers. Each of the plurality of service providers may include one or more service units. A service ticket may be transferred between service units of the plurality of service providers. The instructions may be further configured to cause the processor to extract service unit record data for each service unit and ticket status change record data from the service ticket data and aggregate the service unit record data and the ticket status change record data based on timing of transferring the service ticket between the service units. The instructions may be further configured to cause the processor to calculate ticket level performance metric data for the plurality of service providers based on the aggregated record data and generate ticket level performance scores for the plurality of service providers based on the ticket level performance metric data. The instructions may be further configured to cause the processor to obtain service level performance metric data for the plurality of service providers and generate service level performance scores for the plurality of service providers based on the service level performance metric data. The instructions may be further configured to cause the processor to obtain service feedback performance metric data for the plurality of service providers and generate service feedback performance scores for the plurality of service providers based on the service feedback metric data.

The instructions may be further configured to cause the processor to merge the ticket level performance metric data, the ticket level performance scores, the service level performance metric data, the service level performance scores, the service feedback performance metric data and the service feedback performance scores to generate a set of performance vectors. The instructions may be further configured to cause the processor to evaluate, with a machine learning model, overall performance of the plurality of service providers based on the set of performance vectors.

One interesting feature of the systems and methods described below may be that it may accurately identify the specific service provider that actually lead to the degrade of the overall service by multiple service providers. For example, instead attributing the service ticket performance metric score to the service provider who finally resolved or closed the service ticket, the systems and methods may subdivide the service ticket performance metrics and attribute the scores of the subdivided performance metrics to different service providers between which the service ticket has transferred in its lifecycle. In this way, the intermediate service providers for the service ticket can be identified and both the intermediate service providers and the final service provider of the service ticket can be accurately evaluated. In addition, using the multi-criteria decision making model such as the AHP model, the systems and methods may evaluate the overall performance of the service providers in the way that identifies the service provider option achieving the most suitable trade-off among the different performance metrics instead of the service provider option optimizing each of the individual performance metrics.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

DETAILED DESCRIPTION

To address the inefficiency and inaccuracy caused by manual service provider performance evaluation, the methods and systems in the present disclosure make use of machine learning models to perform service provider performance analysis and classify the service providers into appropriate bands without manual intervention. The service provider performance evaluation may take into account various metrics including user feedback, organization defined quality metrics, functional improvement metrics, cost metrics, and service delivery metrics.

Figure 1:
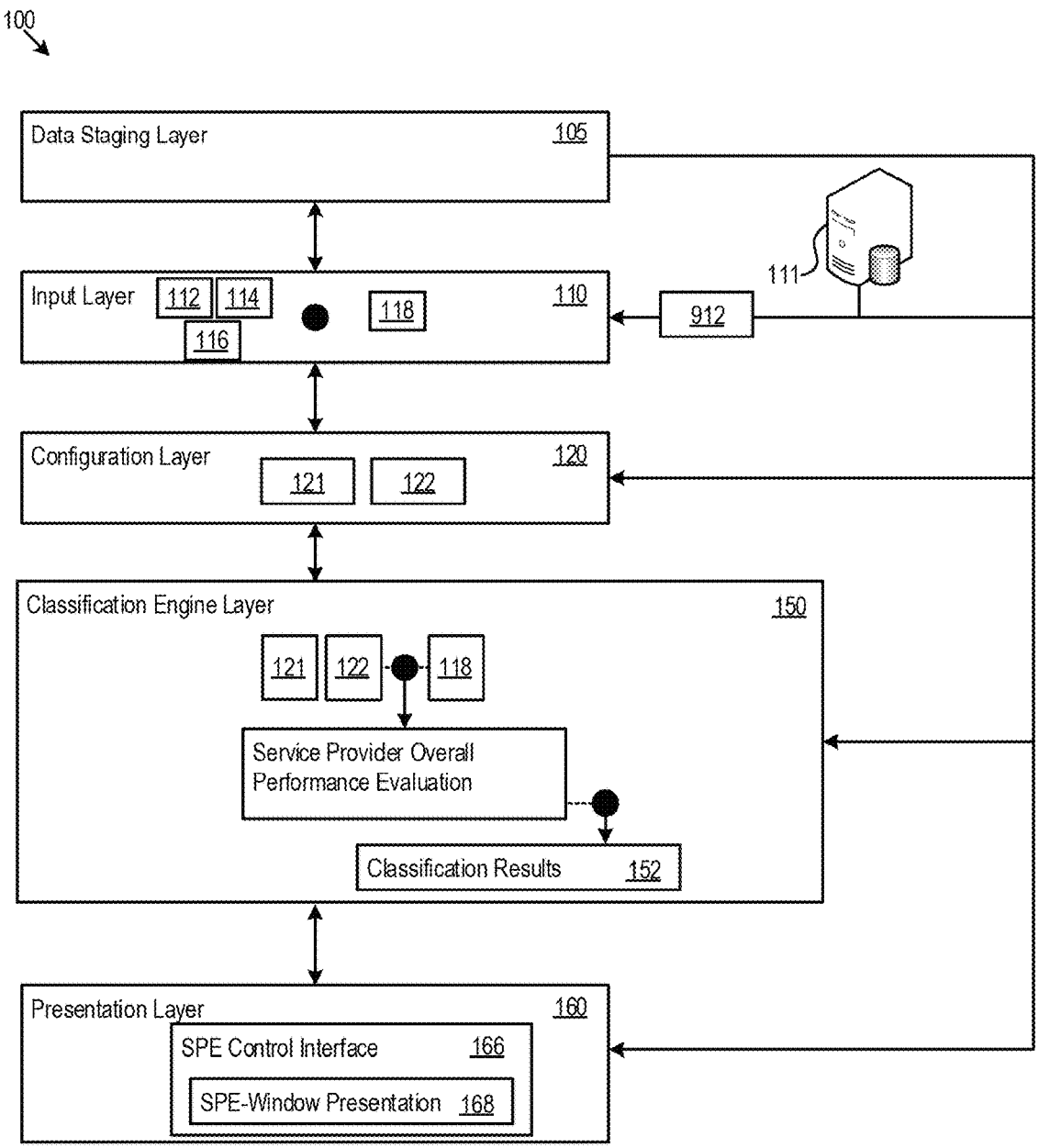
FIG. 1 shows an exemplary multiple-layer service provider evaluation stack.

FIG. 1 shows an example multiple layer service provider evaluation (SPE) stack 100. In this example, the SPE stack 100 includes a data staging layer 105, an input layer 110, a configuration layer 120, a classification engine layer 150, and a presentation layer 160. The SPE stack 100 may include a multiple-layer computing structure of hardware and software that may provide prescriptive analytical service provider performance evaluation through data analysis.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the SPE stack 100, the data staging layer 105 may provide the input layer 110 with storage resources to store ingested data within a database or other data structure. In some implementations, the data staging layer 105 may be deployed as a cloud-based database platform with the capability to process mass data. In an example, an underlying Big Data Lake of the database platform is capable of ingesting data from heterogeneous data sources such as Amazon Simple Storage Service (S3), Secured Storage, Hadoop file systems (HDFS) connections, relation databases, flat files, and other data operations. Hence, the data staging layer 105 may provide a hardware resource, e.g., memory storage resources, to the input layer 110. Accordingly, the multiple-layer stack architecture of the SPE stack 100 may improve the functioning of the underlying hardware.

Figure 2:
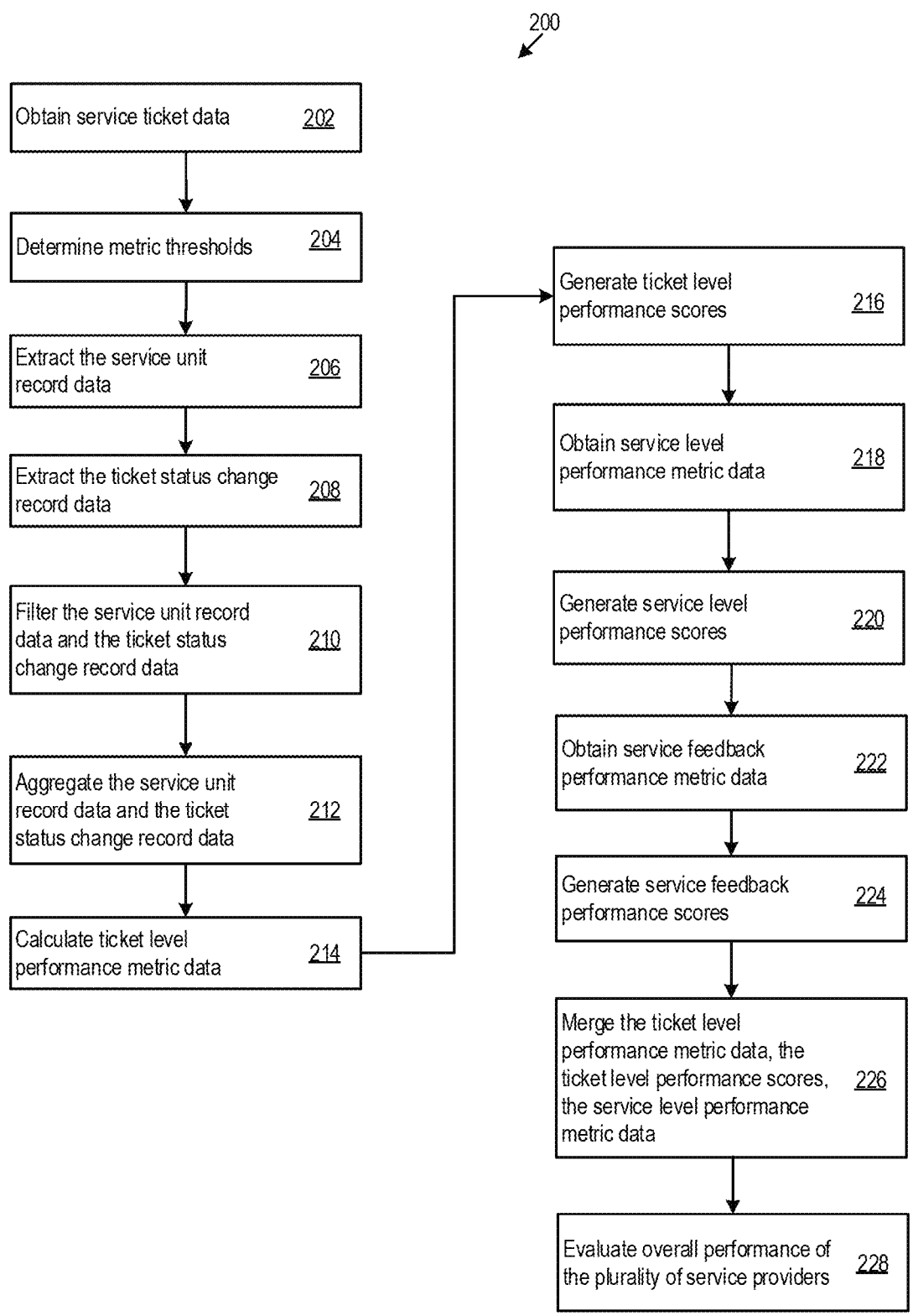
FIG. 2 shows an exemplary service provider evaluation logic.

In the following, reference is made to FIG. 1 and the corresponding example SPE logic (SPL) 200 in FIG. 2. The logical features of SPL 200 may be implemented in various orders and combinations. For example, in a first implementation, one or more features may be omitted or reordered with respect to a second implementation. At the input layer 110 of the SPE stack 100, the SPL 200 may obtain service ticket data 112 for service tickets processed by a plurality of service providers as the input data (202). The service providers may provide various business services for an organization, for example, including the IT service, the accounting service, and the consulting service. The organization may use the service providers to perform the same or different type of business services. Each of the service providers may include multiple service units such as the departments performing distinct functions. A service ticket may be transferred between the service units of the service providers.

In some cases, the service ticket data 112 may be received via communication interfaces (e.g., communication interfaces 912, discussed below). The service ticket data 112 may be accessed at least in part, e.g., via the communication interfaces 912, from data sources 111, which may include, service management database, service level performance metric data store, service performance survey repository, or other data sources.

Optionally, at the input layer 110, the SPL 200 may pre-process the input data. In some implementations, the pre-processing may include data transformations on the input data such as z transformation or log transformation and treatment of outlier data, anomaly data, and missing value data in the input data. The SPL 200 then may, at the input layer 110, store the pre-processed input data 118 via a memory operation at the data staging layer 105. In some implementations, the pre-processed input data 118 may be indexed to speed up query processing.

At the configuration layer 120, the SPL 200 may determine metric thresholds 121 for various service performance metrics and service performance scoring rules 122 (204). For example, the metric thresholds 121 and the service performance scoring rules 122 may be predetermined and the SPL 200 may retrieve the metric thresholds 121 and the service performance scoring rules 122 via the data staging layer 105. For another example, the SPL 200 may determine the metric thresholds 121 from the service-level agreement (SLA) with the service providers. The metric thresholds may include, for example, initial response time threshold, reassignment time threshold, and resolution time threshold as defined in the SLA.

Figure 3:
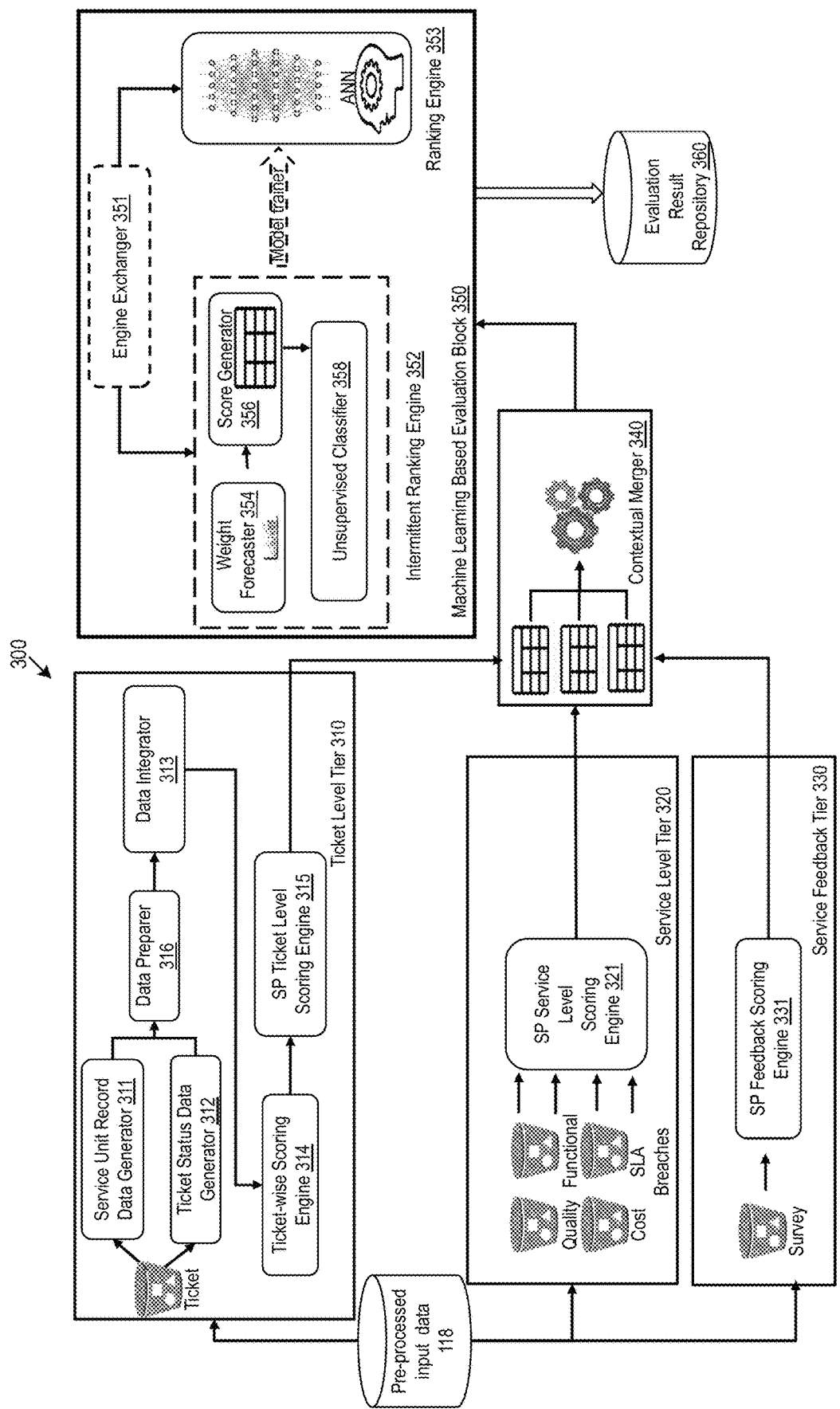
FIG. 3 shows an exemplary specific execution implementation for a classification engine layer of the service provider evaluation stack in accordance with an embodiment.

At the classification engine layer 150, the SPL 200 may analyze the service performance metric data of the plurality of service providers to generate service performance evaluation for the service providers. FIG. 3 is an example specific execution implementation 300 for the classification engine layer 150 of the SPE stack 100. The operations of the SPL 200 at the classification engine layer 150 will be described with reference to FIG. 3.

The execution environment 300 may include a ticket level tier 310, a service level tier 320, a service feedback tier 330, a context merger 340, and a machine learning based evaluation block 350. The ticket level tier 310 may include a service unit record data generator 311, a ticket status data generator 312, a data preparer 316, a data integrator 313, a ticket-wise scoring engine 314, and a service provider ticket level scoring engine 315. The service level tier 320 may include a service provider service level scoring engine 321. The service feed tier 330 may include a service provider feedback scoring engine 331. The machine learning based evaluation block 350 may include an engine exchanger 351, an intermittent ranking engine 352, and a ranking engine 353. The intermittent ranking engine 352 may include a weight forecaster 354, a score generator 356, and an unsupervised classifier 358.

The SPL 200 may generate ticket level performance scores for the plurality of service providers at the ticket level tier 310. At the service unit record data generator 311 of the ticket level tier 310, the SPL 200 may extract the service unit record data for each service unit and ticket status change record data from the service ticket data 112 (206). For a service ticket, the service unit record data may represent the data record that the service ticket transfers between the service units. For example, the service unit record data may include the service unit transferring time stamp and the service unit, as illustrated in Table 1.

TABLE 1

Service Unit Record Data For a Service Ticket

| Service Ticket ID | Service Provider | Service Unit | Transferring Time Stamp |
| --- | --- | --- | --- |
| INC0222513 | Vendor 1 | Global Service Desk | 2021/06/09 17:06:25 |
| INC0222513 | Vendor 2 | Professional DevOps Analytics | 2021/06/10 13:55:35 |
| INC0222513 | Vendor 3 | Just-BI L2 Next Gen D&A | 2021/06/11 04:43:55 |

At the ticket status data generator 312 of the ticket level tier 310, the SPL 200 may extract the ticket status change record data from the service ticket data 112 (208). For a service ticket, the ticket status change record data may represent the change process of ticket status of the service ticket. The ticket status may include, for example, New, Active, Awaiting User Input, Awaiting Change, Resolved or Closed. The ticket status change record data may, for example, include the ticket status modification time stamp and the ticket status, as illustrated in Table 2.

TABLE 2

Ticket Status Change Record Data For a Service Ticket

| Service Ticket ID | Status | Modification Time Stamp |
| --- | --- | --- |
| INC0222513 | New | 2021/06/09 17:06:25 |
| INC0222513 | Active | 2021/06/09 17:08:45 |
| INC0222513 | Awaiting User Input | 2021/06/18 11:56:15 |
| INC0222513 | Resolved | 2021/06/29 09:47:40 |
| INC0222513 | Closed | 2021/06/29 09:49:12 |

At the data preparer 316 of the ticket level tier 310, the SPL 200 may filter the service unit record data and the ticket status change record data by service tickets (210). In an example, the SPL 200 may filter out the record data with respect to a service ticket where the recorded status of the service ticket does not include Resolved or Closed. In another example, the SPL 200 may remove the record data with respect to a service ticket out of the service unit record data and the ticket status change record data if the service ticket was opened more than a predetermined time ago, such as six months. In a further example, the SPL 200 may only keep the record data with respect to a service ticket in the service unit record data and the ticket status change record data when there are service level performance metric data and service feedback performance metric data with respect to the service ticket, which will be discussed later.

At the data integrator 313 of the ticket level tier 310, the SPL 200 may aggregate the service unit record data and the ticket status change record data based on timing of transferring the service ticket between the service units (212). In an implementation, for a service ticket, the SPL 200 may combine the service unit transferring time stamp and the ticket status modification time stamp and sort the time stamps in ascending order. Then, the SPL 200 may generate the aggregated record data based on the combined time stamps. In an example, the aggregated record data may be constructed as a table with an intermediate service unit field and an intermediate ticket status field for each of the combined time stamps.

The SPL 200 may determine a value of the intermediate service unit field based on the service unit transferring time stamp and the service unit in the service unit record data. In an example, for each time stamp of the combined time stamps, the SPL 200 may get the service unit corresponding to this time stamp from the service unit record data as the value of the intermediate service unit field. If this time stamp is not available in the service unit record data, the SPL 200 may get the service unit corresponding to the latest value of the transferring time stamp that is less than this time stamp as the value of the intermediate service unit field.

The SPL 200 may determine a value of the intermediate ticket status field based on the ticket status modified time stamp and the ticket status in the ticket status change record data. In an example, for each time stamp of the combined time stamps, the SPL 200 may obtain the ticket status corresponding to this time stamp from the ticket status change record data as the value of the intermediate ticket status field. If this time stamp is not available in the ticket status change record data, the SPL 200 may obtain the ticket status corresponding to the latest value of the transferring time stamp that is less than this time stamp as the value of the intermediate ticket status field.

Table 3 illustrates the aggregated record data aggregating the service unit record data in Table 1 with the ticket status change record data in Table 2. The field of "Time Spent" is calculated as the difference between adjacent "Modification Time Stamps." In the similar way, the SPL 200 may generate the aggregated record data for each of the service tickets.

provider, the SPL 200 may only consider the first record with the New ticket status in the aggregated record data in computing the initial response time. If a service ticket directly gets Resolved or Closed after New status, or the service ticket is put to Awaiting status such as Awaiting Change or Awaiting User input after New status and then gets Resolved or Closed without being put into Active status, the SPL 200 may not calculate the initial response time.

The SPL 200 may calculate, from the aggregated record data, the resolution time as a time period that the service ticket spends in the Active ticket status for a final service provider resolving the service ticket. Where the aggregated record data does not include the Active ticket status, the SPL 200 may calculate the resolution time as a time period that the service ticket spends in the New ticket status. If there is not record with the status equal to Active or New for the final service provider of the service ticket, the SPL 200 may not calculate the resolution time.

The SPL 200 may determine, from the aggregated record data, the reassignment time as a time period that the service ticket spends in the Active ticket status for service providers other than the final service provider, i.e., the intermediate service providers. The SPL 200 may determine, from the aggregated record data, the reopen count as a number of times that a service ticket is opened. The reopen count may be attributed to the service provider resolving the ticket before the service ticket is reopened.

TABLE 3

Aggregated Record Data For a Service Ticket

| Service Ticket ID | Status | Service Provider | Service Unit | Modification Time Stamp | Time Spent (Hours) |
|---|---|---|---|---|---|
| INC0222513 | New | Vendor1 | Global Service Desk | 2021/06/09 17:06:25 | 0.04 |
| INC0222513 | Active | Vendor1 | Global Service Desk | 2021/06/09 17:08:45 | 20.78 |
| INC0222513 | Active | Vendor2 | Professional DevOps Analytics | 2021/06/10 13:55:35 | 14.81 |
| INC0222513 | Active | Vendor3 | Just-BI L2 Next Gen D&A | 2021/06/11 04:43:55 | 175.21 |
| INC0222513 | Awaiting User Input | Vendor3 | Just-BI L2 Next Gen D&A | 2021/06/18 11:56:15 | 261.86 |
| INC0222513 | Resolved | Vendor3 | Just-BI L2 Next Gen D&A | 2021/06/29 09:47:40 | 0.03 |
| INC0222513 | Closed | Vendor3 | Just-BI L2 Next Gen D&A | 2021/06/29 09:49:12 | NULL |

At the ticket-wise scoring engine 314 of the ticket level tier 310, the SPL 200 may calculate ticket level performance metric data for the plurality of service providers based on the aggregated record data (214). The ticket level performance metric data may include, for example, an initial response time, a reassignment time, a resolution time, a reopen count, or a first time fix. When a service ticket transfers between multiple service providers, the ticket level performance metrics for the service ticket may be attributed to different service providers according to the ticket status of the service ticket corresponding to the individual service providers.

The SPL 200 may calculate, from the aggregated record data, the initial response time as a time period that the service ticket spends in the New ticket status. If the service ticket appears in New ticket status for more than one service The metric first time fix may be applicable only for selected service providers who are allowed to perform the first time fix. For example, if we have two service providers "L1 Support" and "L2 Support" such that "L2 Support" gets the service ticket only after the service ticket has arrived at "L1 Support", then only "L1 Support" may be able to perform the first time fix and thus the metric first time fix is calculated only for "L1 Support".

For purpose of illustration, based on the aggregated record data in the Table 3, the SPL may determine the initial response time of 0.04 hours attributed to the Vendor1, the reassignment time of 20.78 hours attributed to the Vendor1, the reassignment time of 14.81 hours attributed to the Vendor2, and the resolution time of 175.21 hours attributed to the Vendor3.

TABLE 3

Aggregated Record Data For a Service Ticket

| Service Ticket ID | Status | Service Provider | Service Unit | Time Spent (Hours) | |
|---|---|---|---|---|---|
| INC0222513 | New | Vendor1 | Global Service Desk | 0.04 | Initial response time |
| INC0222513 | Active | Vendor1 | Global Service Desk | 20.78 | Reassignment time |
| INC0222513 | Active | Vendor2 | Professional DevOps Analytics | 14.81 | Reassignment time |
| INC0222513 | Active | Vendor3 | Just-BI L2 Next Gen D&A | 175.21 | Resolution time |
| INC0222513 | Awaiting User Input | Vendor3 | Just-BI L2 Next Gen D&A | 261.86 | |
| INC0222513 | Resolved | Vendor3 | Just-BI L2 Next Gen D&A | 0.03 | |
| INC0222513 | Closed | Vendor3 | Just-BI L2 Next Gen D&A | NULL | |

The SPL 200 may calculate scores for the ticket level performance metrics based on the metric thresholds 121 and the service performance scoring rules 122 for the individual ticket level performance metrics. In an example, the service performance scoring rule for the metric initial response time may be defined as shown in the Table 4. For purpose of illustration, if the initial response time is less than or equal to 25% of the initial response time threshold, for example, defined in the SLA, the score for the metric initial response time is 10. If initial response time is greater than 25% of the initial response time threshold but less than or equal to 50% of the initial response time threshold, the score for the metric initial response time is 9. The similar service performance scoring rules may be defined for the metrics of reassignment time and resolution time.

TABLE 4

Scoring Rule For Metric Initial Response Time

| Upper Limit | Score |
|---|---|
| 25% | 10 |
| 50% | 9 |
| 75% | 8 |
| 100% | 7 |
| 150% | 6 |
| 200% | 5 |
| 300% | 4 |
| 500% | 3 |
| 1000% | 2 |
| Infinite | 1 |

By way of example, the scoring rule for the metric reopen count may include:
If the reopen count is 0, the score is 10;
If the reopen count is 1, the score is 6;
If the reopen count is 2, the score is 3; and
If the reopen count is greater than 2, the score is 1.
The scoring rule for the metric first time fix may include:
If the first time fix is YES, the score is 10; and
If the first time fix is NO, the score is 1.

At the service provider ticket level scoring engine 315 of the ticket level tier 310, for each of the service providers, the SPL 200 may generate ticket level performance scores for the plurality of service providers based on the ticket level performance metric data (216). In an implementation, the SPL 200 may weigh the scores of the individual ticket level performance metrics for the service provider to generate a normalized score for the service provider. For example, the weights for the metrics initial response time, reassignment time, resolution time, reopen count, and first time fix may be 20%, 20%, 30%, 20%, and 10%, respectively.

While evaluating the service provider performance, the ticket level performance may not be sufficient to decide whether a service provider is a potential or weak performer. A service provider may contribute to organizations business by its innovative ideas, process improvements or functionality development ideas, which may be reflected in the service level performance metric data.

Referring to FIG. 1, at the input layer 110 of the SPE stack 100, the SPL 200 may obtain service level performance metric data 114 for the plurality of service providers (218). The service level performance metric data may include, for example, the service quality metric data, the functional improvement metric data, the cost metric data, and the service-level agreement breach metric data. By way of example, the service quality metric data may include a percentage of reopened ticket, a percentage of first call resolution (FCR), an average handling time (AHT), and an average speed of answer (ASA). Optionally, the SPL 200 may pre-process the service level performance metric data 114 at the input layer 110 in the way similar to the pre-processing of service ticket data 112 as discussed above. Table 5 illustrates the exemplary service quality metric data for multiple service providers.

TABLE 5

Exemplary Service Quality Metric Data

| Service Provider | Re-opened ticket % | FCR % | AHT | ASA |
|---|---|---|---|---|
| Vendor1 | 5 | 9 | 8 | 3 |
| Vendor2 | 9 | 7 | 8 | 3 |
| Vendor3 | 10 | 8 | 8 | 4 |
| Vendor4 | 6 | 6 | 8 | 4 |
| Vendor5 | 10 | 9 | 7 | 2 |
| Vendor6 | 6 | 6 | 8 | 4 |
| Vendor7 | 10 | 9 | 7 | 2 |

Referring to FIG. 3, at the service provider service level scoring engine 321 of the service level tier 320, the SPL 200 may generate service level performance scores for the plurality of service providers based on the service level performance metric data (220). In an implementation, the SPL 200 may make use of the Technique for Order Preference by Similarity to Ideal Solution (TOPSIS) to generate the service level performance scores. Specifically, the SPL 200 may calculate a normalized decision matrix $R=r_{ij})_{m \times n}$ based on the service level performance metric data of the plurality of service providers using the Equation 1.

$$r_{ij} = \frac{x_{ij}}{\sqrt{\sum_{k=1}^{m} x_{kj}^2}} \quad \text{Equation 1}$$

Where $x_{ij}$ is the value of the service level performance metrics, for example, the value of the service quality metrics as shown in the Table 5.

Then, the SPL 200 may weigh data in the normalized matrix to obtain a weighted normalized decision matrix using the Equation 2.

$$t_{ij}=r_{ij}\times w_j,\ i=1,2,\ldots,m;j=1,2,\ldots,n \quad \text{Equation 2}$$

Where $w_j=W_j/\Sigma_{k=1}^{n}W_k$, $j=1, 2, \ldots$, n and $W_j$ is the weight for the service level performance metric.

For purpose of illustration, Table 6 shows the exemplary weighted normalized decision matrix for the service quality metric data as shown in the Table 5.

TABLE 6

Exemplary Weighted Normalized Decision Matrix

| Service Provider | Re-opened ticket % | FCR % | AHT | ASA |
|---|---|---|---|---|
| Vendor1 | 0.270369035 | 0.510343 | 0.45808 | 0.4082 |
| Vendor2 | 0.486664263 | 0.396934 | 0.45808 | 0.4082 |
| Vendor3 | 0.54073807 | 0.453638 | 0.45808 | 0.5443 |
| Vendor4 | 0.324442842 | 0.340229 | 0.45808 | 0.5443 |
| Vendor5 | 0.54073807 | 0.510343 | 0.40082 | 0.2722 |
| Vendor6 | 0.319347777 | 0.367884 | 0.45808 | 0.5121 |
| Vendor7 | 0.518475847 | 0.521356 | 0.41105 | 0.2673 |

Based on the weighted normalized decision matrix, the SPL 200 may identify a positive impact (or best) alternative $A_b$ and a negative impact (or worst) alternative $A_w$ based on the weighted normalized decision matrix $t_{ij}$ using Equation 3.

$$A_w=\{(\max(t_{ij}|i=1,2,\ldots,m)|j\in J_-),(\min(t_{ij}|i=1,2,\ldots,m)|j\in J_+)\}=\{t_{wj}|j=1,2,\ldots,n\},$$

$$A_b=\{(\min(T_{ij}|i=1,2,\ldots,m)|j\in J_-),(\max(t_{ij}|i=1,2,\ldots,m)|j\in J_+)\}=\{t_{bj}|j=1,2,\ldots,n\}, \quad \text{Equation 3}$$

Where $J_+=\{j=1, 2, \ldots, n|j\}$ is associated with the criteria having a positive impact and $J_-=\{j=1, 2, \ldots, n|j\}$ is associated with the criteria having a negative impact. For purpose of illustration, Table 7 shows the positive impact alternative and the negative impact alternative.

TABLE 7

Exemplary Positive/Negative Impact Alternatives

| | Re-opened ticket % | FCR % | AHT | ASA |
|---|---|---|---|---|
| $A_b$ | 0.094629162 | 0.127586 | 0.11452 | 0.0816 |
| $A_w$ | 0.189258325 | 0.085057 | 0.1002 | 0.0408 |

Then, the SPL 200 may calculate separate distances of service provider alternatives from the positive impact alternative and the negative impact alternative and measure, based on the separate distance, relative closeness of the service provider alternatives to the positive impact alternative as the service level performance scores of the service providers using Equation 4.

$$S=S_i^-/(S_i^+ + S_i^-) \quad \text{Equation 4}$$

Where S is the similarity scores between the service provider alternatives. $S^+$ and $S^-$ are L2-norm Euclidean distances from a target alternative to the positive impact alternative and the negative impact alternative, respectively. For purpose of illustration, Table 8 shows the service level performance scores for the individual service providers in the Table 6.

TABLE 8

Exemplary Service Level Performance Scores

| Service Provider | Score |
|---|---|
| Vendor1 | 0.8394 |
| Vendor2 | 0.2919 |
| Vendor3 | 0.3509 |
| Vendor4 | 0.6519 |
| Vendor5 | 0.2901 |
| Vendors | 0.697 |
| Vendor7 | 0.5 |

The service provider performance evaluation may also take into account service feedback performance metric data. The service feedback performance metric data may reflect customers' attitude to the performance of the service providers. Referring to FIG. 1, at the input layer 110 of the SPE stack 100, the SPL 200 may obtain service feedback performance metric data 116 for the plurality of service providers (222). The service feedback performance metric data may include, for example, the team availability, the responsiveness, the communication, and the domain knowledge. Optionally, the SPL 200 may pre-process the service feedback performance metric data 116 at the input layer 110 in the way similar to the pre-processing of service ticket data 112 as discussed above. Table 9 illustrates the exemplary service feedback performance metric data for multiple service providers.

TABLE 9

Exemplary Service Feedback Performance Metric Data

| Service Provider | Team Availability | Responsiveness | Communication | Domain Knowledge |
|---|---|---|---|---|
| Vendor1 | 5 | 9 | 8 | 8 |
| Vendor2 | 9 | 7 | 8 | 9 |
| Vendor3 | 10 | 8 | 8 | 8.5 |
| Vendor4 | 6 | 6 | 8 | 9 |
| Vendor5 | 10 | 9 | 7 | 9 |
| Vendor6 | 6 | 6 | 8 | 9 |
| Vendor7 | 10 | 9 | 7 | 7 |

Referring to FIG. 3, at the service provider feedback scoring engine 331 of the service feedback tier 330, the SPL 200 may generate service feedback performance scores for the plurality of service providers based on the service feedback metric data (224). In an implementation, the SPL 200 may make use of the TOPSIS to generate the service feedback performance scores in the way similar to the generation of the service level performance scores at the service level tier 320 as discussed above.

Specifically, the SPL 200 may calculate a normalized decision matrix based on the service feedback metric data of the plurality of service providers; weight data in the normalized matrix to obtain a weighted normalized decision matrix; identify a positive impact alternative and a negative impact alternative based on the weighted normalized decision matrix; calculate separate distances of service provider alternatives from the positive impact alternative and the negative impact alternative; and measure relative closeness of the service provider alternatives to the positive impact alternative as the service feedback performance scores of the service providers. For purpose of illustration, Table 10 shows the weighted normalized decision matrix for the service feedback performance metric data shown in Table 9 and the service feedback performance scores for the individual service providers.

TABLE 10

Exemplary Feedback Performance Scores

| Service Provider | Team Availability | Responsiveness | Communication | Domain Knowledge | Score |
|---|---|---|---|---|---|
| Vendor1 | 0.094629162 | 0.127585795 | 0.114519667 | 0.06161954 | 0.8394 |
| Vendor2 | 0.170332492 | 0.099233396 | 0.114519667 | 0.069321982 | 0.2919 |
| Vendor3 | 0.189258325 | 0.113409595 | 0.114519667 | 0.065470761 | 0.3509 |
| Vendor4 | 0.113554995 | 0.085057197 | 0.114519667 | 0.069321982 | 0.6519 |
| Vendor5 | 0.189258325 | 0.127585795 | 0.100204709 | 0.069321982 | 0.2901 |
| Vendor6 | 0.111771722 | 0.091970901 | 0.114519667 | 0.067818649 | 0.697 |
| Vendor7 | 0.181466547 | 0.130339 | 0.102763538 | 0.055016064 | 0.5 |

At the contextual merger 340, the SPL 200 may merge the ticket level performance metric data, the ticket level performance scores, the service level performance metric data, the service level performance scores, the service feedback performance metric data and the service feedback performance scores to generate a set of performance vectors (226). The merging is joining across columns that have different surface forms for the same entity. In an example, the SPL 200 may perform merge based on a deep learning model such as the Contextual Convolutional Neural Networks (CCNA) model. Specifically, the SPL 200 may, with the deep learning model, map surface forms of an entity into a set of vectors such that alternate forms for the same entity are closest in vector space and index these vectors using a nearest neighbors algorithm to find the forms that can be potentially joined together. The surface forms are the multiple ways that a language has of referring to entities. Text exploration must consider variations in surface forms in order to achieve reasonable recall when performing meaningful insight search.

After the merging, the SPL 200 may evaluate, with a machine learning model, overall performance of the plurality of service providers based on the set of performance vectors at the machine learning based evaluation block 350 (228). In an implementation, the machine learning model is an unsupervised machine learning model such as K-means clustering model and the SPL 200 may perform the overall performance evaluation at the intermittent ranking engine 352.

At the weight forecaster 354 of the intermittent ranking engine 352, the SPL 200 may predict, with a multi-criteria decision making model, weights of performance metrics in the ticket level performance metric data, the service level performance metric data, and the service feedback performance metric data. At the score generator 356 of the intermittent ranking engine 352, the SPL 200 may generate, with the multi-criteria decision making model, overall performance scores for the plurality of service providers based on the weights of the performance metrics and the set of performance vectors.

In an implementation, the multi-criteria decision making model may include the AutoRegressive Integrated Moving Average (ARIMA) model and Analytic Hierarchy Process (AHP) model. The ARIMA is a statistical analysis model that uses time series data to either better understand the data set or to predict future trends. The prediction process by the ARIMA model may get weights for the metrics at metric level. The AHP model is a structured technique for organizing and analyzing complex decisions. Rather than prescribing a "correct" decision, the AHP model may help decision makers find one that best suits their goal and their understanding of the problem.

Specifically, with the AHP model, the SPL 200 may consider a set of performance evaluation metrics, and a set of alternative options among which the best decision is to be made. Since some of the performance metrics could be contrasting, it is not true in general that the best option is the one which optimizes each single performance metric, rather the one which achieves the most suitable trade-off among the different metrics. The SPL 200 may generate a weight for each performance evaluation metric according to the decision maker's pairwise comparisons of the metrics. Next, for a specific metric, the SPL 200 may assign a score to each service provider combination option according to the decision maker's pairwise comparisons of the options based on that metric. The higher the score is, the better the performance of the option with respect to the specific metric is. Finally, the SPL 200 may combine the metric weights and the options scores to determine a global score for each option. The global score for a given service provider combination option is a weighted sum of the scores it obtains with respect to all the metrics.

For purpose of illustration, Table 11 shows the exemplary matrix of individual performance metric scores including ticket level performance scores, service level performance scores such as service quality performance scores, and service feedback performance scores as well as the generated overall performance scores of the service providers.

TABLE 11

Exemplary Feedback Performance Scores

| Service Provider | Quality | Delivery | Services | Cost | Functionality improvement | User Feedback | SLA | Scores |
|---|---|---|---|---|---|---|---|---|
| Vendor 1 | 0.1594 | 0.1759 | 0.1484 | 0.1539 | 0.1667 | 0.2057 | 0.3913 | 0.1737 |
| Vendor 2 | 0.0715 | 0.0941 | 0.1954 | 0.1539 | 0.1667 | 0.2057 | 0.0435 | 0.1032 |
| Vendor 3 | 0.2374 | 0.372 | 0.4163 | 0.4559 | 0.1667 | 0.2057 | 0.0435 | 0.2983 |
| Vendor 4 | 0.3501 | 0.0234 | 0.0404 | 0.0349 | 0.1667 | 0.1073 | 0.3913 | 0.1948 |
| Vendor 5 | 0.0488 | 0.1759 | 0.0645 | 0.0775 | 0.0833 | 0.1073 | 0.0435 | 0.0883 |
| Vendor 6 | 0.0261 | 0.0371 | 0.0248 | 0.0349 | 0.0833 | 0.061 | 0.0435 | 0.0333 |
| Vendor 7 | 0.1067 | 0.1215 | 0.1104 | 0.089 | 0.1667 | 0.1073 | 0.0435 | 0.1084 |

At the unsupervised classifier 358 of the intermittent ranking engine 352, the SPL 200 may classify, with the unsupervised machine learning model, the plurality of service providers based on the overall performance scores. In an example, the unsupervised machine learning model is the K-means clustering model, which may identify k number of centroids, and then allocates every data point to the nearest cluster, while keeping the centroids as small as possible. For purpose of illustration, Table 12 shows the exemplary classification 152 of service providers based on the overall performance scores of the service providers.

TABLE 12

Exemplary Classification of Service Provider

| Rank | Vendor Name | Score | Band |
|------|-------------|--------|-----------|
| 1 | Vendor 3 | 0.2983 | Potential |
| 2 | Vendor 4 | 0.1948 | Potential |
| 3 | Vendor 1 | 0.1737 | Average |
| 4 | Vendor 7 | 0.1084 | Average |
| 5 | Vendor 2 | 0.1032 | Average |
| 6 | Vendor 5 | 0.0883 | Poor |
| 7 | Vendor 6 | 0.0333 | Poor |

Additionally or alternatively, at the ranking engine 353, the SPL 200 may evaluate, with the artificial neural network model, the overall performance of the plurality of service providers. Specifically, the SPL 200 may classify, with the artificial neural network (ANN) model, the plurality of service providers based on the set of performance vectors. The artificial neural network may use different layers of mathematical processing to make sense of the information it receives. Typically, an artificial neural network may have anywhere from dozens to millions of artificial neurons called units arranged in a series of layers. The input layer may receive various forms of information from the outer world. This is the data that the network aims to process or learn about. From the input unit, the data goes through one or more hidden units. The hidden unit's job is to transform the input into something the output unit can use. The ANN may be fully connected from one layer to another. These connections are weighted. The higher the layer number is, the greater influence one unit has on another. As the data goes through each unit, the network may learn more about the data. On the other side of the network is the output units, and this is where the network responds to the data that it was given and processed. For the ANN to learn, it should have access to a large amount of information, called a training set. For example, to train an ANN to differentiate between service providers, the training set would provide tagged service providers so the network would begin to learn. Once it has been trained with the significant amount of data, it will try to classify future service provider data based on the data set throughout the different units.

In an implementation, the SPL 200 may make use of classification results 152 of the service providers generated at the intermittent ranking engine 352 as the training data to train the ANN model. During the training period, the SPL 200 may, at the engine exchanger 351, compare a classification accuracy with the artificial neural network model at the ranking engine 353 with a classification accuracy with the unsupervised machine learning model at the intermittent ranking engine 352. Then, at the engine exchanger 351, the SPL 200 may determine to classify the plurality of service providers with the artificial neural network model at the ranking engine 353 or the unsupervised machine learning model at the intermittent ranking engine 352 based on a result of the comparison.

For example, if the classification accuracy of the ranking engine 353 is greater than or equal to the classification accuracy of the intermittent ranking engine 352 while the classification accuracy of the intermittent ranking engine 352 is greater than or equal to the classification accuracy of the ranking engine 353 minus a predetermined percentage threshold, e.g., 5%, the SPL 200 may determine to classify the service providers with the artificial neural network model at the ranking engine 353. Otherwise, the SPL 200 may classify the service providers with the unsupervised machine learning model at the intermittent ranking engine 352.

For purpose of illustration, the SPL 200 may execute the example routines in Table 13 to implement functions of the classification engine layer 150 in individual modules of the execution environment 300.

TABLE 13

Example Routine for prescribing service provider evaluation

Description

| | |
|---|---|
| Example Routine | Performance metric calculation logic at the ticket level tier 310<br>    Calculate initial response time<br>        time_df['Init_Resp_Time_Percent'] =<br>time_df.InitialResponseTime/<br>(self.time_thresh_dict['InitialResponse'] *<br>time_df.SLAReferenceTime)<br>        Calculate reassignment time<br>time_df['Reassig_Time_Percent'] = time_df.ReassignmentTime/<br>(self.time_thresh_dict['Reassignment'] * time_df.SLAReferenceTime)<br>        Calculate resolution time<br>        time_df['Resolv_Time_Percent'] = time_df.ResolutionTime/<br>(self.time_thresh_dict['Resolution'] * time_df.SLAReferenceTime)<br>    time_df.drop(columns = ['SLAReferenceTime'], inplace = True)<br>        Calculate FCR<br>if 'Calc_FCR' in time_df.columns:<br>    time_df['FCRFlag'] = (time_df.Calc_FCR).astype('float')<br>    index = time_df.FinalAG_Vendor = =<br>time_df.IntermediateAG_Vendor<br>        time_df.loc[~index, 'FCRFlag'] = np.nan<br>        time_df.drop(columns = ['Calc_FCR'], inplace = True)<br>else:<br>    time_df['FCRFlag'] = np.nan |

TABLE 13-continued

Example Routine for prescribing service provider evaluation

Description

Performance metric calculation logic at Service Level Tier 320 and
Service Feedback Tier 330:
Select the Alternatives and Metrics:
   alts = [Vendor1', Vendor2, Vendor3 . . . VendorN]
   metrics = [Re-opened ticket %', FCR %', AHT, ASA' . . . Cn]
   weights = [0.10, 0.20, 0.30, 0.20, 0.20 . . . Wn]
   Preparing model data format:
       xij = pd.DataFrame(matrix, index = alts, columns = crits)
   Normalizing the interval decision matrix using the following vector
   transformations to reduce the effect of data magnitude:

$$y_{ij}^L = \frac{x_{ij}^L}{\sqrt{\sum_{i=1}^{m}\left((x_{ij}^L)^2 + (x_{ij}^U)^2\right)}}, i = 1, 2\ldots, m, j = 1, 2, \ldots n,$$

$$y_{ij}^U = \frac{x_{ij}^U}{\sqrt{\sum_{i=1}^{m}\left((x_{ij}^L)^2 + (x_{ij}^U)^2\right)}}, i = 1, 2\ldots, m, j = 1, 2, \ldots n.$$

Identifying positive and negative ideal solutions as follows:

$$A^+ = \{v_1^+, v_2^+, \ldots, v_n^+\}$$
$$= \left\{\left(\max_i v_{ij}^U, j \in J_b\right), \left(\min_i v_{ij}^L, j \in J_c\right)\right\}$$

$$A^- = \{v_1^-, v_2^-, \ldots, v_n^-\}$$
$$= \left\{\left(\max_i v_{ij}^L, j \in J_b\right), \left(\min_i v_{ij}^U, j \in J_c\right)\right\}$$

Ranking Engine 353 Execution Logic
   mlp = MLPClassifier(hidden_layer_sizes = (5, 5, 5), max_iter = 1000)
   mlp.fit(X_train, y_train.values.ravel( ))
Intermittent Ranking Engine 352 Execution Logic:
   km = KMeans(n_clusters = 3)
   km.fit(X)
   km.predict(X)
   labels = km.labels_
   #labels = [1, 2, 3]
   labels = ['weak', 'AVG', 'potential']
   df['Classification'] = pd.cut(df['label'], labels = labels)
Engine exchange logic at the engine exchanger 351
If (ψ <= ζ and ψ >= ζ − 5%) and BT <= ζ) then
Enable CVPEng
Else
Continue with CVPIEng
End;
ψ - CVPIEng accuracy
ζ - CVPEng accuracy
BT - Business fixed model accuracy threshold Optionally, upon evaluating the overall performance of the service providers, the SPL 200 may execute the similar operations at the classification engine layer 150 to output the evaluation results for the service providers in the cloud data warehouse such as the evaluation result repository 360. For example, the SPL 200 may store the evaluation results for the service providers via a memory operation at the data staging layer 105. Additionally or alternatively, the SPL 200 may publish the service provider evaluation results, for example, via the SPE-control interface 166 as discussed below.

Now referring to the presentation layer 160 in FIG. 1, where the SPL 200 may access the overall performance evaluation results from the classification engine layer 150, e.g., via data staging layer 105 memory operations to generate the SPE-control interface 166 including a SPE-window presentation 168.

Figure 4A:
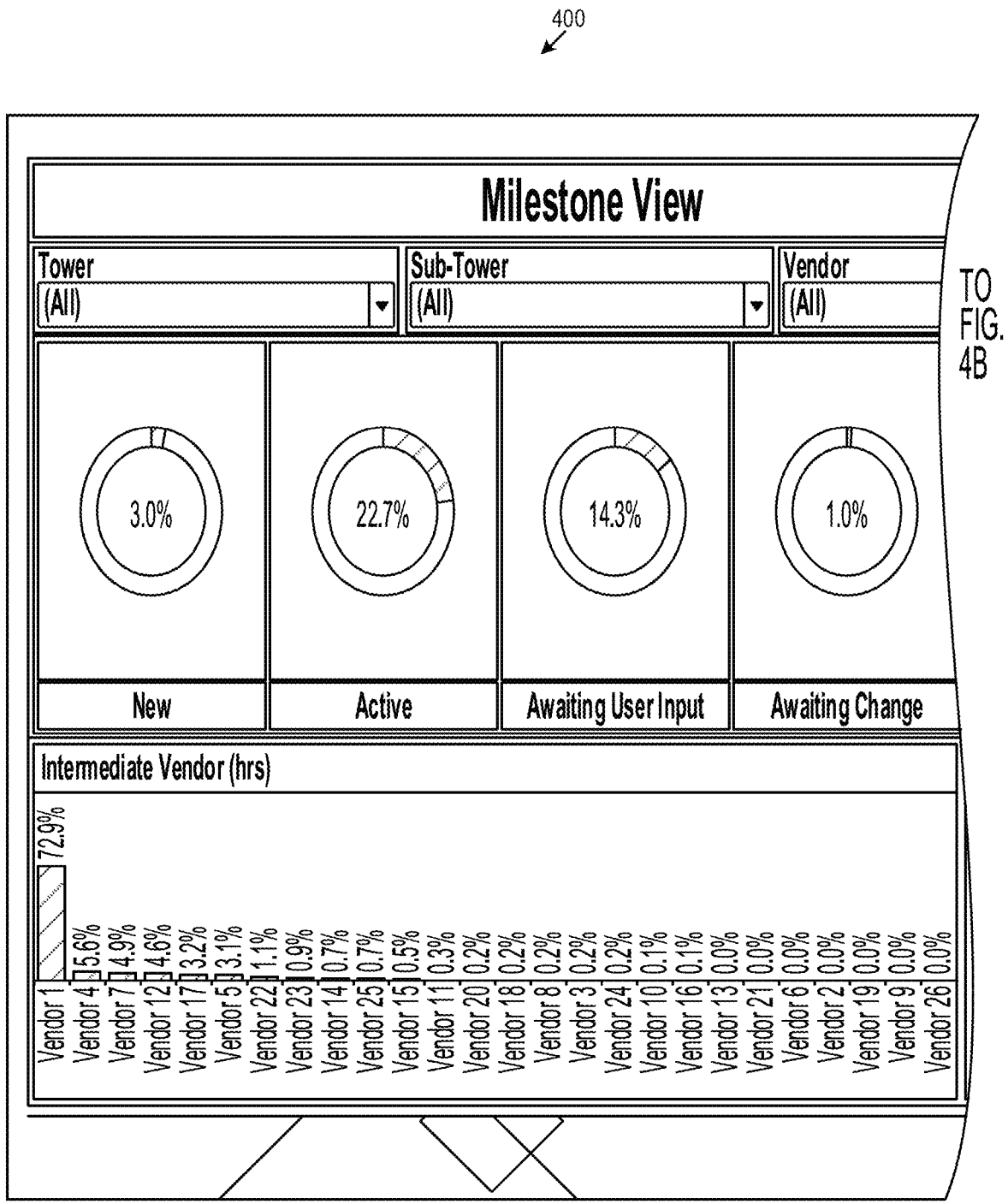
FIGS. 4A-4B show an exemplary service provider evaluation control interface.
Figure 4B:
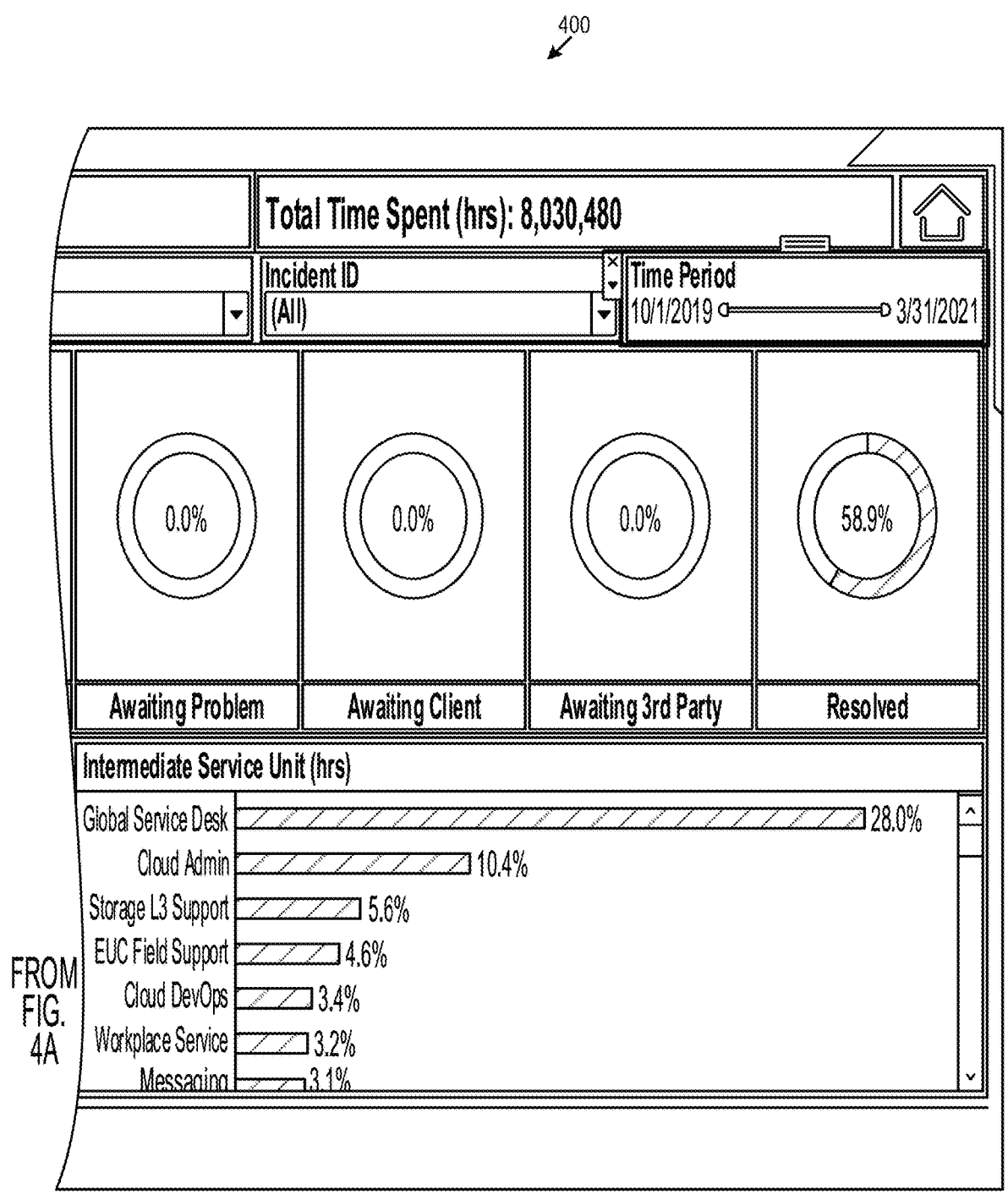

The SPE-window presentation 168 may include data and/or selectable options related to the service provider performance evaluation. In particular, the SPE-window presentation 168 may be configured to display analysis information with regard to the service provider evaluation. In particular, FIGS. 4A-4B illustrate a milestone view 400 indicating where a substantial amount of time is being spent across the ticket lifecycle. The filter options are provided in the view. The system user may select particular service ticket(s) using the filter options. Further the system user may also check for the time spent across milestones of intermediate vendors as well. The intermediate vendors or intermediate service provider are those who have a role to play in the ticket closure but don't own the SLA of the ticket. Often the delay caused by the intermediate vendors gets reflected on the owner vendor or owner service provider, who owns the SLA of the ticket. This view may help to deeply dive and identify the real service providers causing the delay.

Figure 5A:
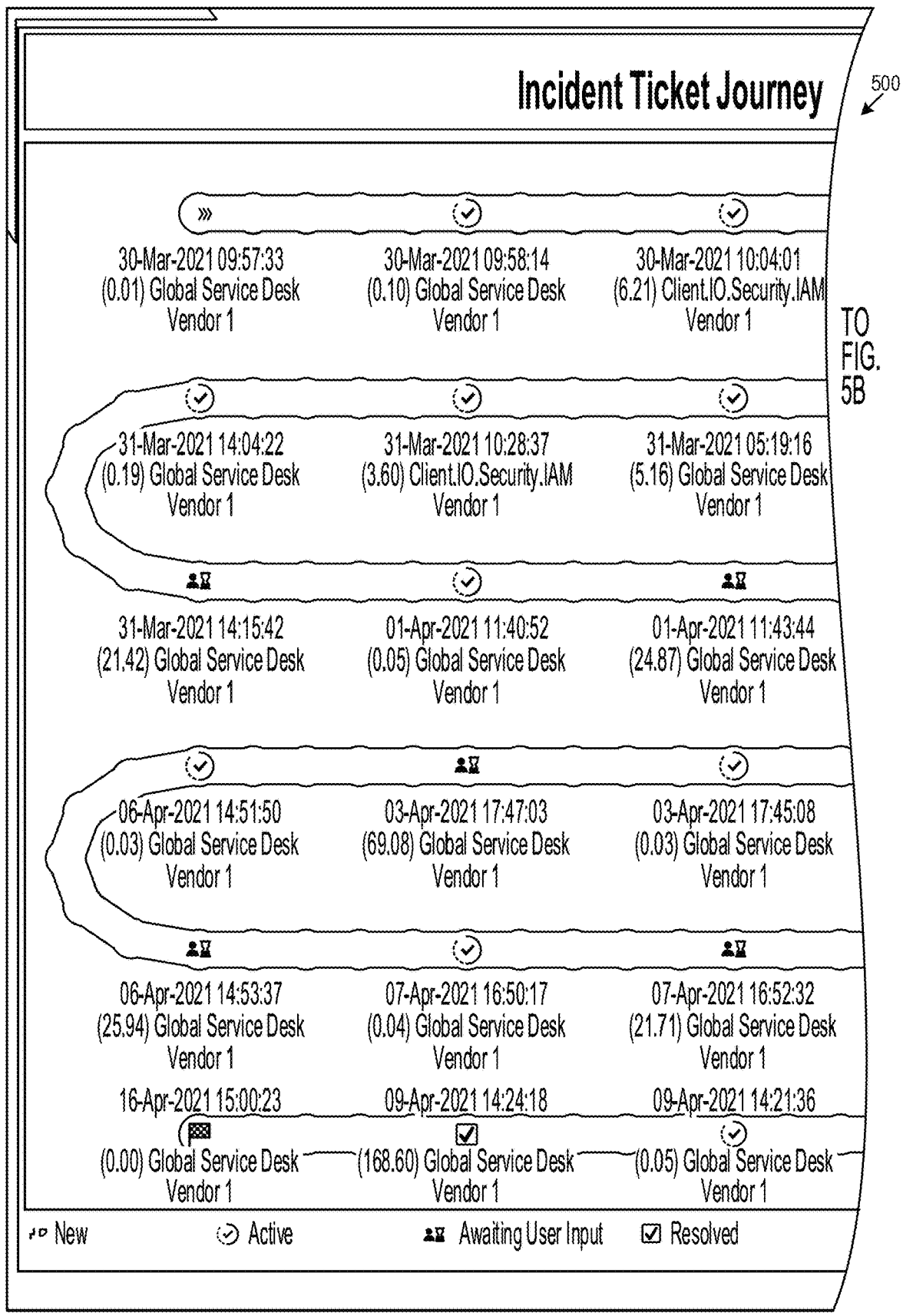
FIGS. 5A-5B show another exemplary service provider evaluation control interface.
Figure 5B:
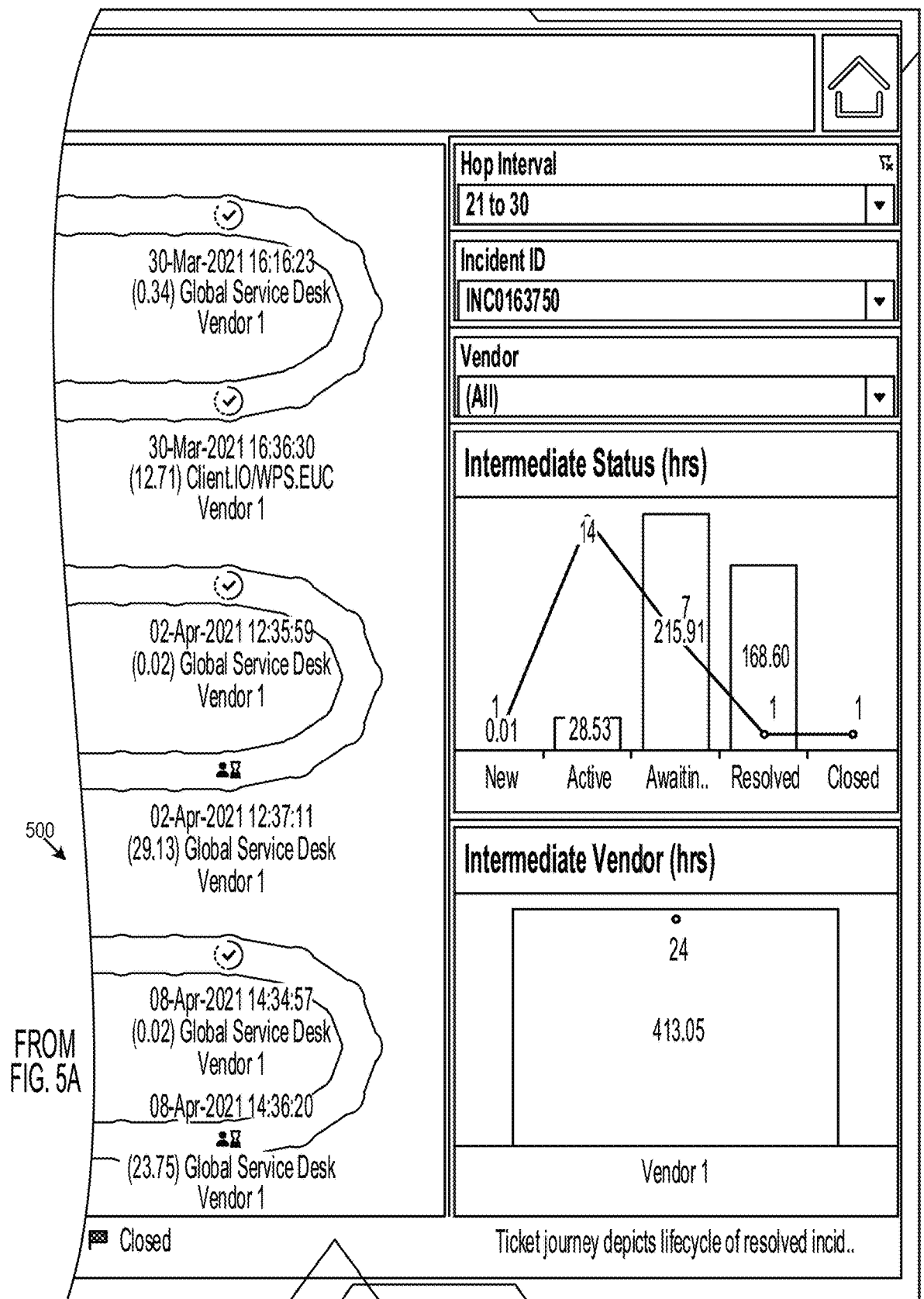

In particular, FIGS. 5A-5B illustrate a ticket transfer view 500 displaying the entire journey of a ticket starting from creation to closure in terms of the different status and service units including the service units of the intermediate vendor. This view may enable the system user to deep dive real time into the specifics of a particular service ticket and capture the information based on ticket transferring mechanism. A system user can clearly check the number of times the ticket has transferred from one service unit to the other and the amount of time spent in each stage.

Figure 6A:
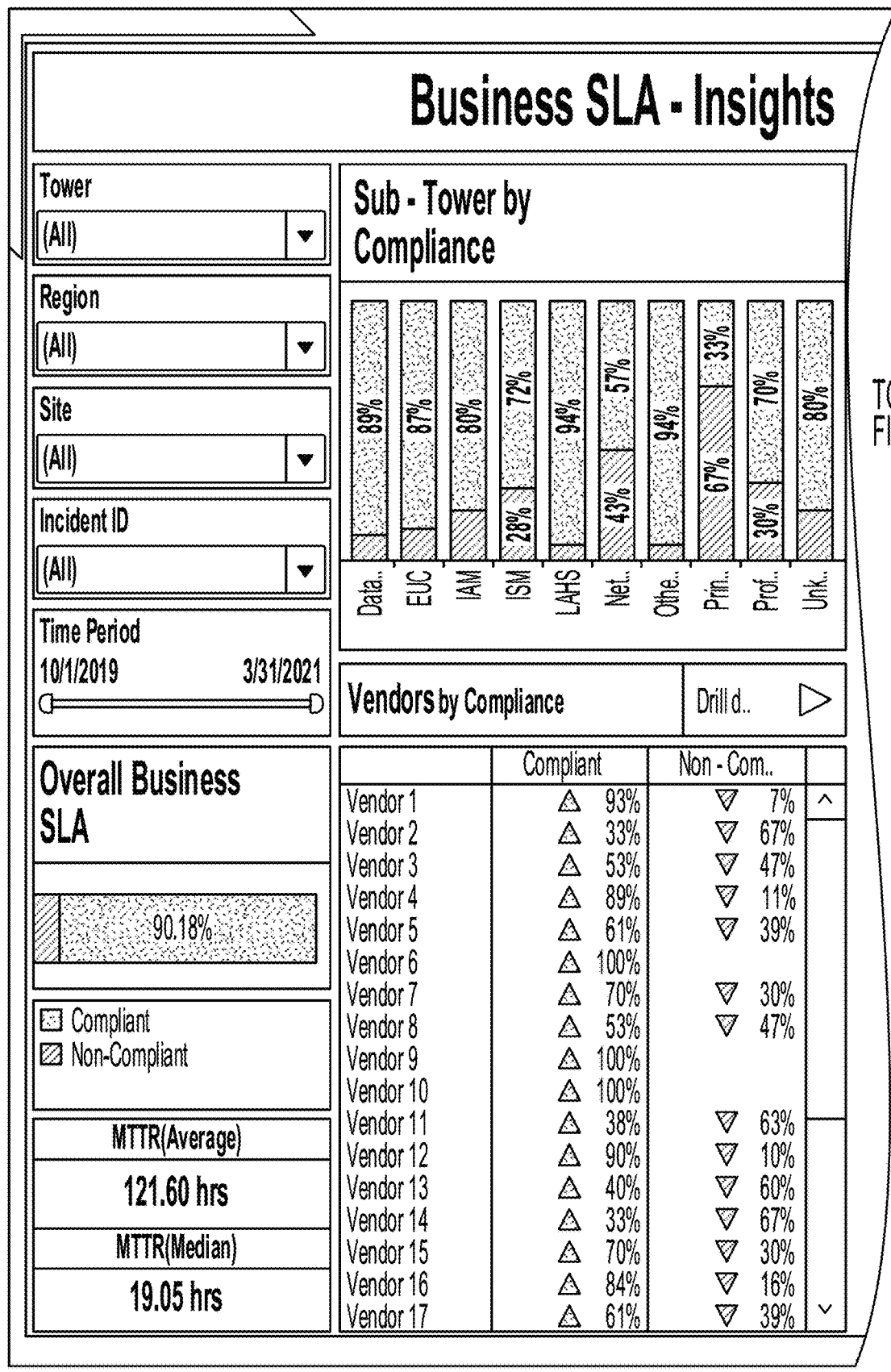
FIGS. 6A-6C show another exemplary service provider evaluation control interface.
Figure 6B:
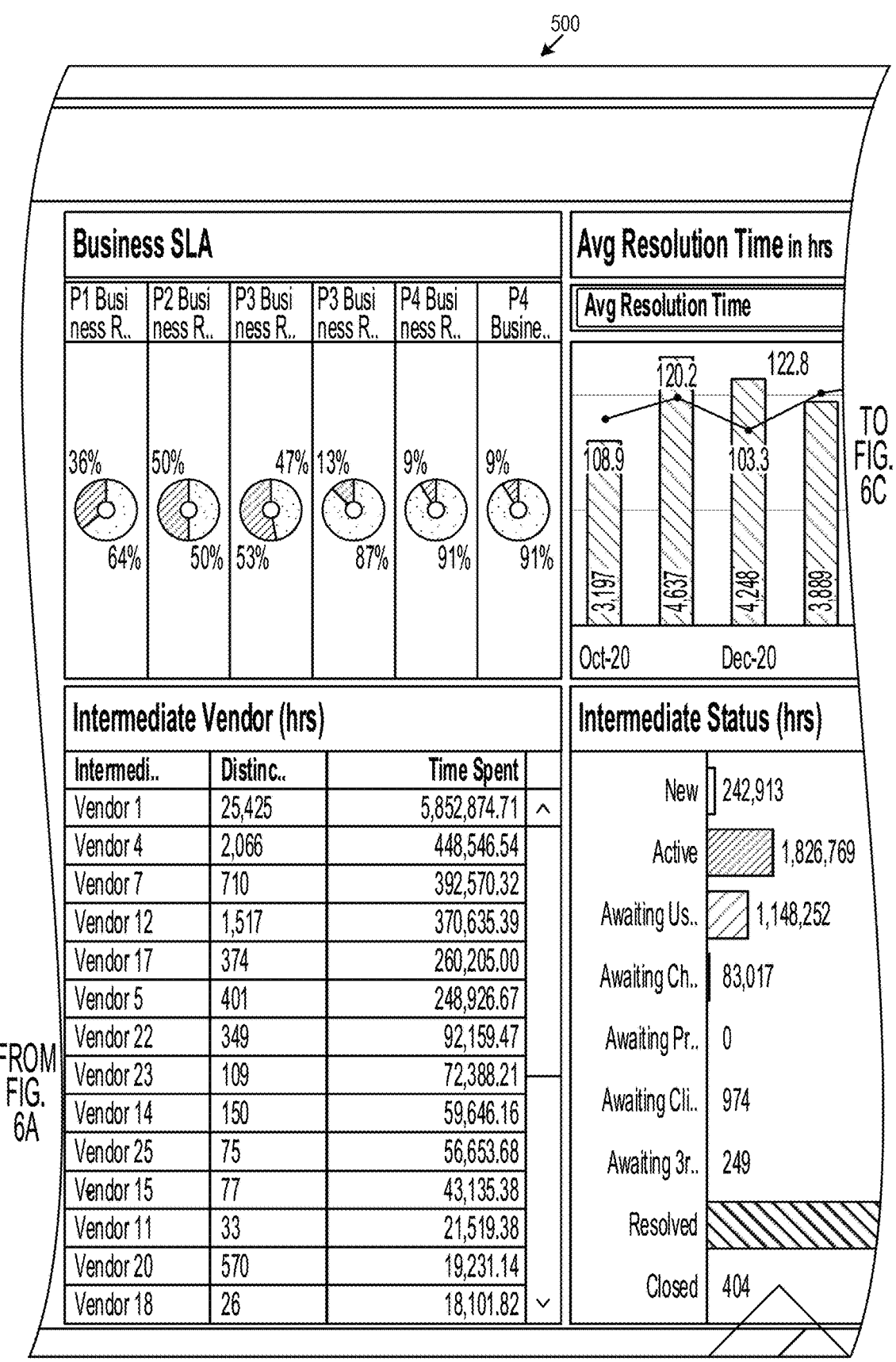
Figure 6C:
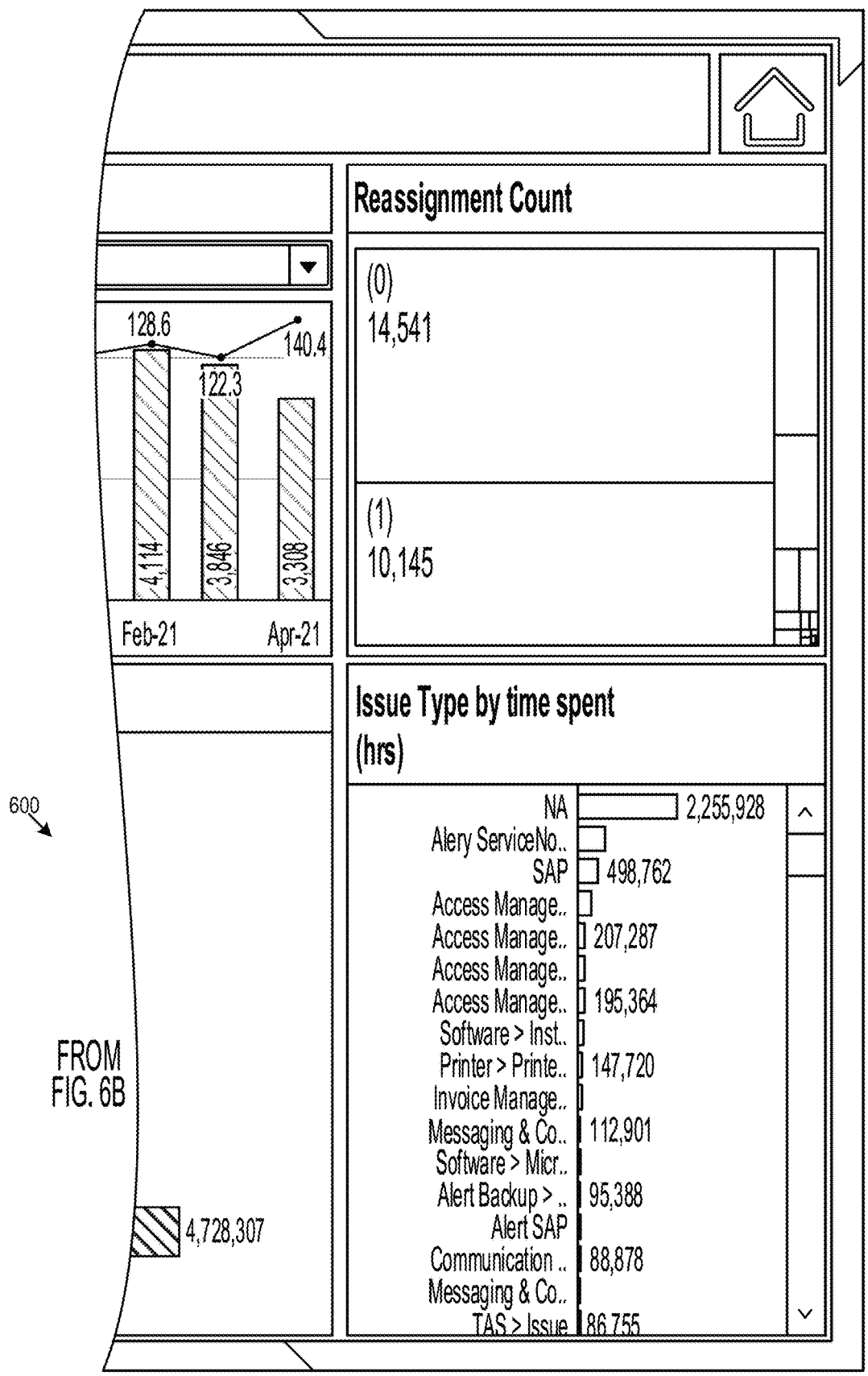

FIGS. 6A-6C illustrate a cohesive view 600 of service performance in a multi-segment/multi-vendor ecosystem. For example, the view may provide the following insights:
Understanding SLA compliance across vendor and intermediate vendors;
Deep insights into contributing factors (such as Issue types) leading to poor performance;
Location based insights, e.g., geographic outlay on vendors and their performance; and
Tickets and issues which have been reassigned multiple times contributing to delays.

Figure 7A:
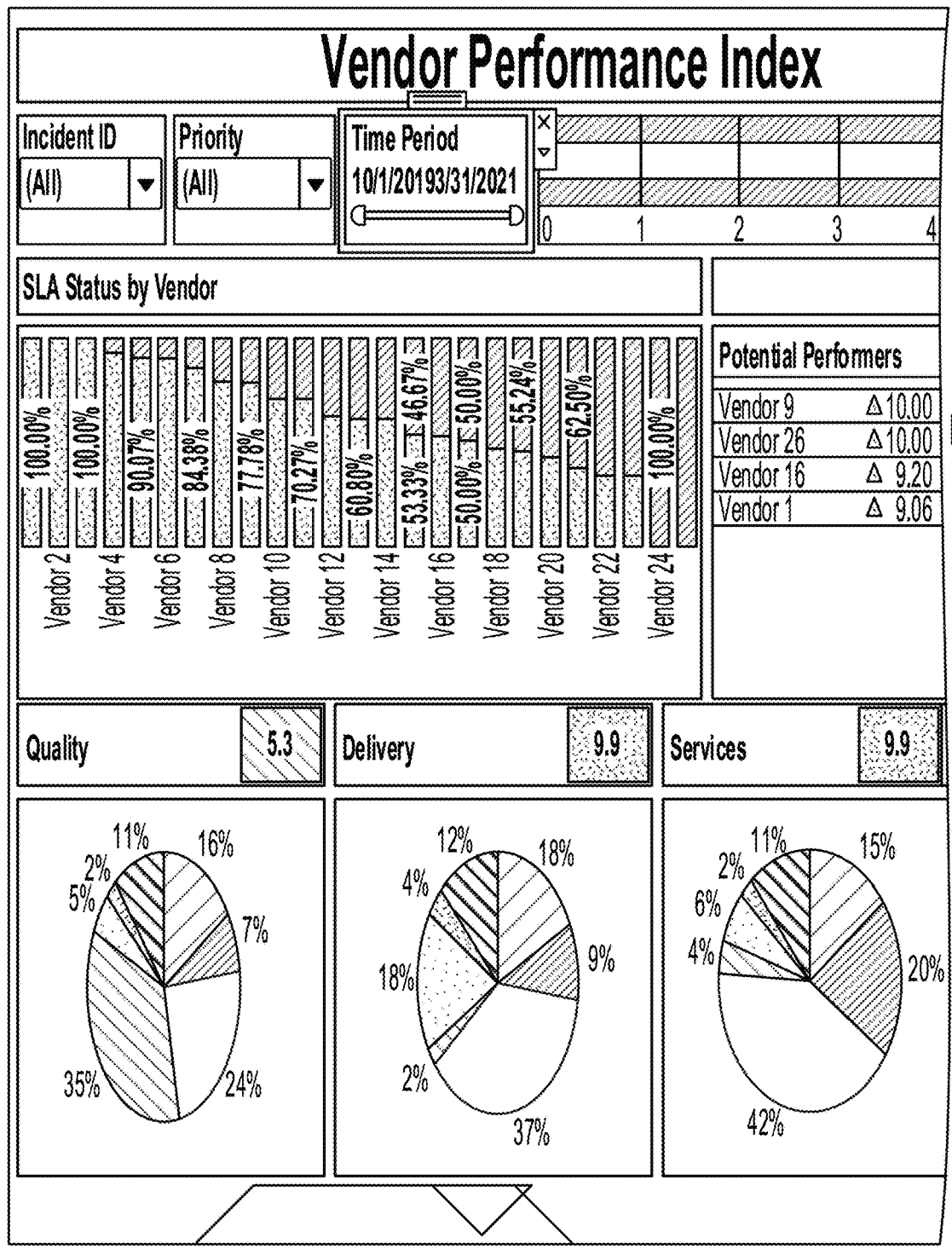
FIGS. 7A-7B show another exemplary service provider evaluation control interface.
Figure 7B:
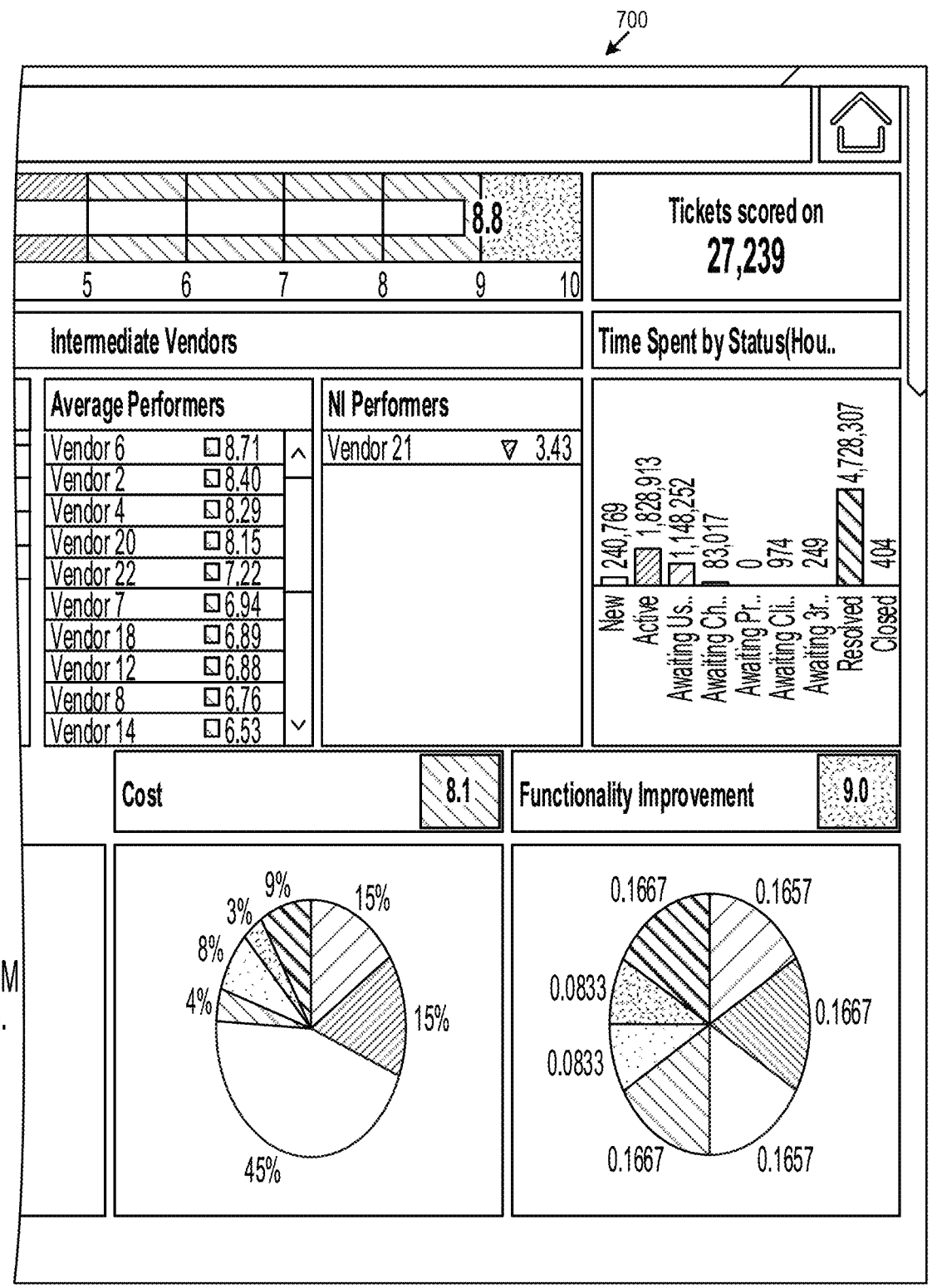

FIGS. 7A-7B illustrate a vendor performance view 700 enabling the system user to compare the performance of all the vendors against a common set of benchmarks. For example, the view may provide the following insights:
Composite index across various key metrics such as the first time fix, the response time, and the resolution;
Vendor score categorization enabling the system user to separate the top performance vendors from the ordinary ones;
Overall time spent across multiple ticket status be each vendor;
The system user may instantly understand which vendor combination has performed better. For instance, a particular owner vendor's performance score could be low, but on closer analysis it could be observed that the intermediate vendors (responsible for certain actions within the ticket) have been performing badly leading to the poor score of this particular owner vendor.

Figure 8:
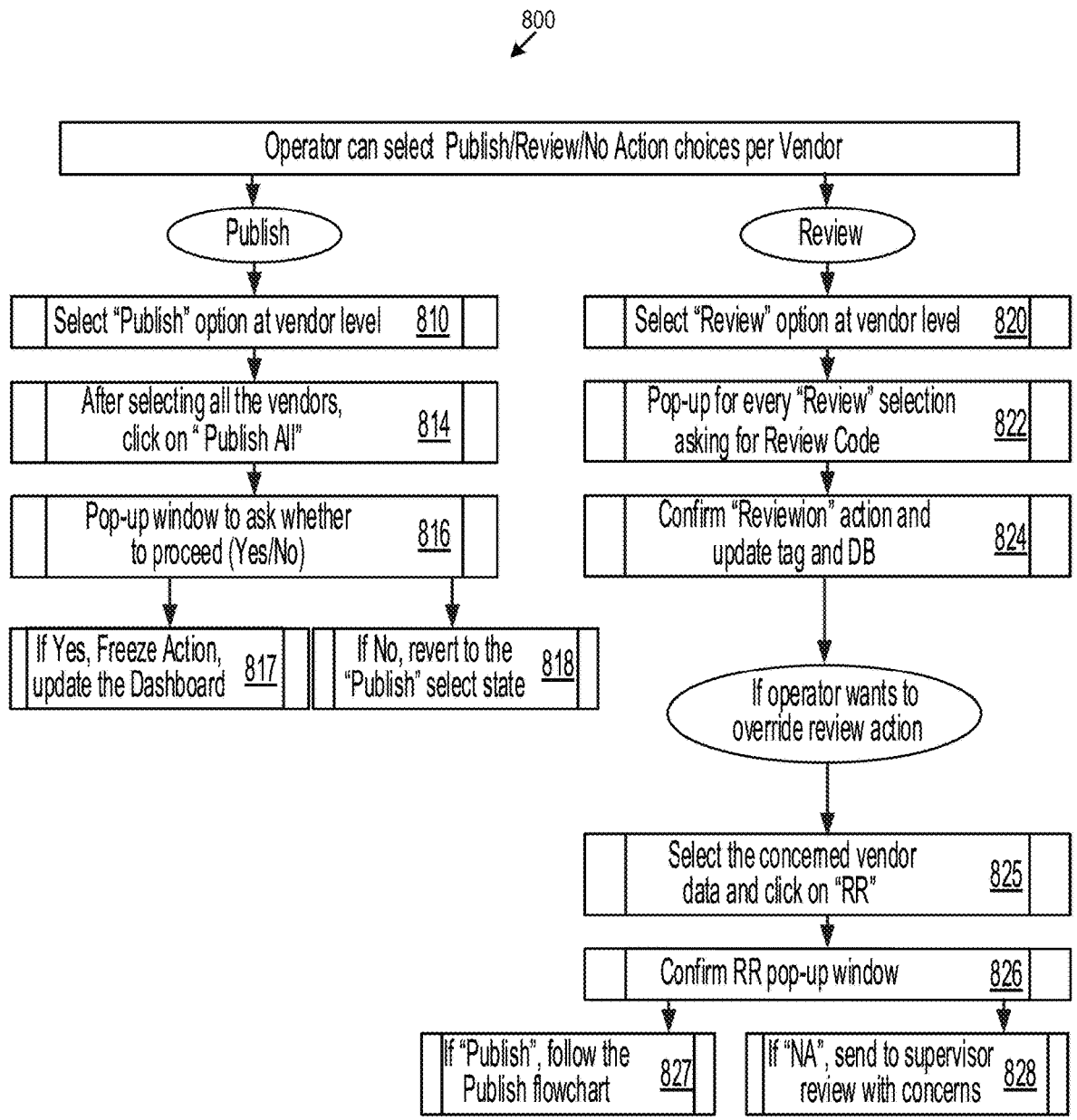
FIG. 8 shows an exemplary interaction logic with a service provider evaluation control interface in accordance with an embodiment.

Additionally or alternatively, the SPE-window presentation 168 may include an option to publish/review one or more (or all of) the vendor evaluation results. FIG. 8 shows an example of an interaction logic 800 between the operator such as a subject matter expert (SME) and the SPE-window presentation 168 to publish/review the displayed evaluation results. Specifically, the operator may take publish/review action per vendor in the SPE-window presentation 168.

For example, the SPE-window presentation 168 may include "Publish," "Review," and "No action" options for each of the vendors. The operator may select "Publish" option at vendor level (810). After finishing the option selections for all the vendors, the operator may click on "Publish All" option (814). As response, the SPE-window presentation 168 may pop-up a window to ask the operator to confirm to proceed with "Yes" and/or "No" options (816). If the operator selects "Yes" option, the SPE-window presentation 168 may freeze action in the window and update the operator's inputs in a dashboard of the SPE-window presentation 168 (817). If the operator selects "No" option, the SPE-window presentation 168 may revert to the "Publish" selection state (818).

The operator may also select "Review" option at vendor level (820). For each "Review" selection, the SPE-window presentation 168 may pop up a window to ask for a review code justifying the review (822). Where the review code is verified, the SPE-window presentation 168 may confirm the review action and update the operator's inputs in the background (824).

Optionally, if the operator would like to override his/her previous review action, the operator may select the concerned vendors and click "RR" option (825). As response, the SPE-window presentation 168 may pop up a window to confirm the "RR" selection with "Publish" and "NA" options (826). If the operator selects "Publish" option, the SPE-window presentation 168 may enable to select the "Publish" option for the concerned vendors (827). If the operator selects "NA", the SPE-window presentation 168 may send to a supervisor of the operator for review with concerns (828).

Figure 9:
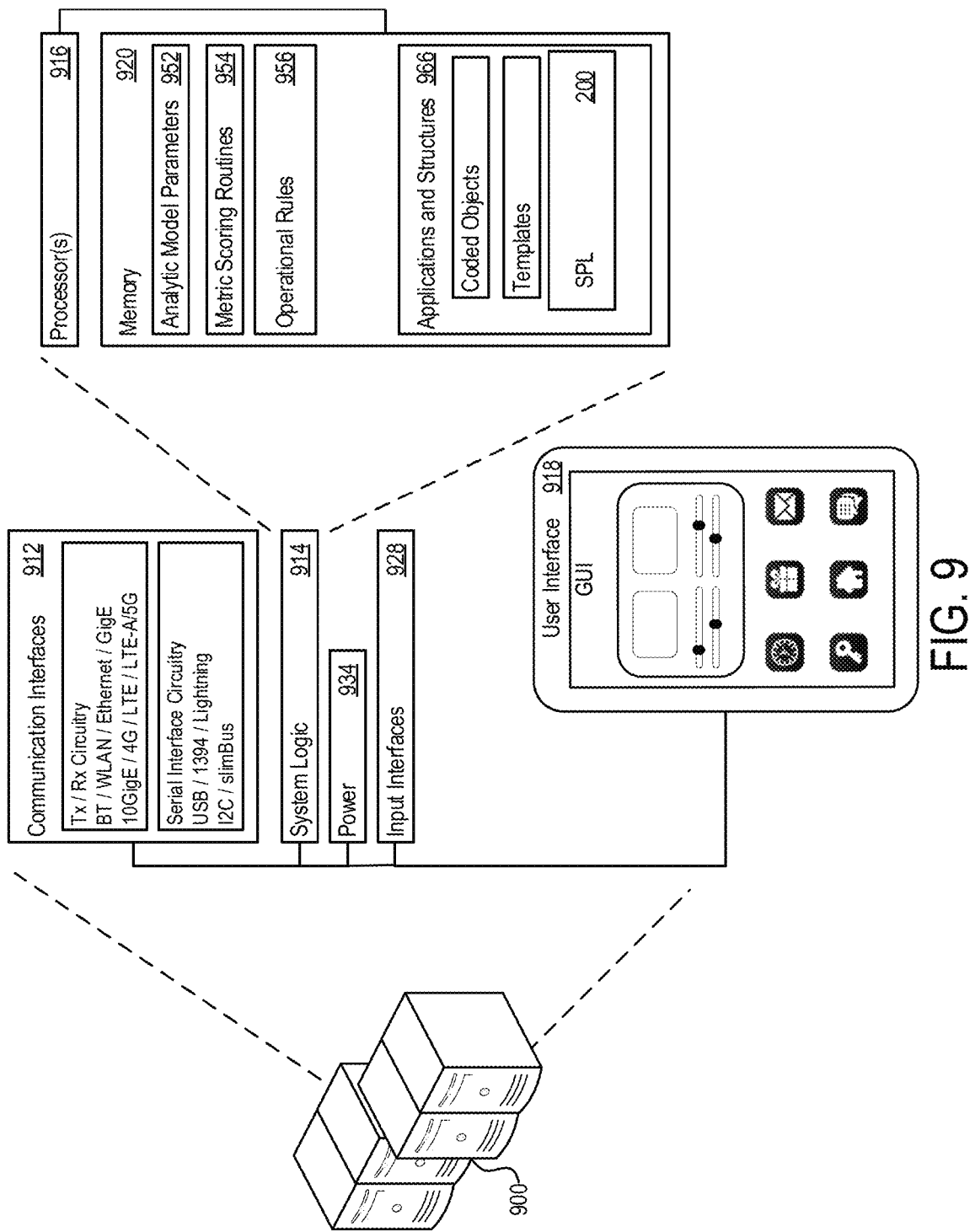
FIG. 9 shows an exemplary specific execution environment for the service provider evaluation stack.

FIG. 9 shows an example specific execution environment 900 for the SPE stack 100 described above. The execution environment 900 may include system logic 914 to support execution of the multiple layers of SPE stack 100 described above. The system logic may include processors 916, memory 920, and/or other circuitry.

The memory 920 may include analytic model parameters 752, metric scoring routines 954, and operational rules 956. The memory 920 may further include applications and structures 966, for example, coded objects, machine instructions, templates, or other structures to support generating various performance scores for service providers, evaluating the overall performance of the service providers, or other tasks described above. The applications and structures may implement the SPL 200.

The execution environment 900 may also include communication interfaces 912, which may support wireless, e.g. Bluetooth, Wi-Fi, WLAN, cellular (4G, LTE/A, 5G), and/or wired, Ethernet, Gigabit Ethernet, optical networking protocols. The communication interfaces 912 may also include serial interfaces, such as universal serial bus (USB), serial ATA, IEEE 1394, lighting port, $I^2C$, slimBus, or other serial interfaces. The communication interfaces 912 may be used to support and/or implement remote operation of the SPE-control interface 166. The execution environment 900 may include power functions 934 and various input interfaces 928. The execution environment may also include a user interface 918 that may include human-to-machine interface devices and/or graphical user interfaces (GUI). The user interface 918 may be used to support and/or implement local operation of the SPE-control interface 166. In various implementations, the system logic 914 may be distributed over one or more physical servers, be implemented as one or more virtual machines, be implemented in container environments such as Cloud Foundry or Docker, and/or be implemented in Serverless (functions as-a-Service) environments.

In some cases, the execution environment 900 may be a specially defined computational system deployed in a cloud platform. In some cases, the parameters defining the execution environment may be specified in a manifest for cloud deployment. The manifest may be used by an operator to requisition cloud-based hardware resources, and then deploy the software components, for example, the SPE stack 100, of the execution environment onto the hardware resources. In some cases, a manifest may be stored as a preference file such as a YAML (yet another mark-up language), JSON, or other preference file type.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CD-ROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A method comprising:
   obtaining, with a processor circuitry, service ticket data for service tickets processed by a plurality of service providers, each of the plurality of service providers comprising one or more service units, wherein a service ticket is transferred between service units of the plurality of service providers;
   extracting, with the processor circuitry, service unit record data for each service unit and ticket status change record data from the service ticket data;
   aggregating, with the processor circuitry, the service unit record data and the ticket status change record data based on timing of transferring the service ticket between the service units;
   calculating, with the processor circuitry, ticket level performance metric data for the plurality of service providers based on the aggregated record data;
   generating, with the processor circuitry, ticket level performance scores for the plurality of service providers based on the ticket level performance metric data;
   obtaining, with the processor circuitry, service level performance metric data for the plurality of service providers;
   generating, with the processor circuitry, service level performance scores for the plurality of service providers based on the service level performance metric data;
   obtaining, with the processor circuitry, service feedback performance metric data for the plurality of service providers;
   generating, with the processor circuitry, service feedback performance scores for the plurality of service providers based on the service feedback metric data;
   merging, with the processor circuitry, the ticket level performance metric data, the ticket level performance scores, the service level performance metric data, the service level performance scores, the service feedback performance metric data and the service feedback performance scores to generate a set of performance vectors; and
   identifying, with the processor circuitry, a first ranking engine and a second ranking engine to be executed by the processor circuitry, the first ranking engine comprises an unsupervised machine learning model trained to evaluate overall performance of a service provider, and the second ranking engine comprises an artificial neural network model trained to evaluate overall performance of a service provider;
   comparing, with the processor circuitry, evaluation accuracy of the first ranking engine with evaluation accuracy of the second ranking engine;
   selecting, with the processor circuitry, an executing ranking engine from the first ranking engine and the second ranking engine based on a result of the comparison;
   inputting, with the processor circuitry, the set of performance vectors into the executing ranking engine executed by the processor circuitry to evaluate overall performance of the plurality of service providers; and
   displaying, with the processor circuitry, evaluation results of the overall performance of the plurality of service providers via a user interface;
   in response to the first ranking engine being selected as the executing ranking engine, training, with the processor circuitry, the artificial neural network model in the second ranking engine with evaluation results outputted by the first ranking engine as training data.

2. The method of claim 1, where in response to the first ranking engine being selected as the executing ranking engine, the inputting the set of performance vectors into the executing ranking engine to evaluate overall performance of the plurality of service providers comprises:
   predicting, with a multi-criteria decision making model executed by the processor circuitry, weights of performance metrics in the ticket level performance metric data, the service level performance metric data, and the service feedback performance metric data;
   generating, with the multi-criteria decision making model executed by the processor circuitry, overall performance scores for the plurality of service providers based on the weights of the performance metrics and the set of performance vectors; and
   classifying, with the unsupervised machine learning model executed by the processor circuitry, the plurality of service providers based on the overall performance scores.

3. The method of claim 2, where in response to the second ranking engine being selected as the executing ranking engine, the inputting the set of performance vectors into the executing ranking engine to evaluate overall performance of the plurality of service providers comprises:
   classifying, with the artificial neural network model executed by the processor circuitry, the plurality of service providers based on the set of performance vectors.

4. The method of claim 1, where the service unit record data comprises a service unit transferring time stamp and a service unit and the ticket status change record data comprises a ticket status modification time stamp and a ticket status, and the aggregating the service unit record data and the ticket status change record data based on timing of transferring the service ticket between the service units comprises:
   combining the service unit transferring time stamp and the ticket status modification time stamp;
   generating the aggregated record data based on the combined time stamps, the aggregated record data comprising an intermediate service unit field and an intermediate ticket status field for each of the combined time stamps;
   determining a value of the intermediate service unit field based on the service unit transferring time stamp and the service unit; and
   determining a value of the intermediate ticket status field based on the ticket status modified time stamp and the ticket status.

5. The method of claim 4, where the ticket level performance metric data comprises an initial response time, a reassignment time, a resolution time, a reopen count, or a first time fix percentage, and the ticket status comprises New, Active, Awaiting User Input, Awaiting Change, Resolved or Closed.

6. The method of claim 5, further comprising:
   calculating, from the aggregated record data, the initial response time as a time period that the service ticket spends in the New ticket status.

7. The method of claim 5, further comprising:
   calculating, from the aggregated record data, the resolution time as a time period that the service ticket spends in the Active ticket status for a final service provider resolving the service ticket; and
   in response to the aggregated record data not including the Active ticket status, calculating, from the aggregated record data, the resolution time as a time period that the service ticket spends in the New ticket status.

8. The method of claim 7, further comprising:
   determining, from the aggregated record data, the reassignment time as a time period that the service ticket spends in the Active ticket status for service providers other than the final service provider.

9. The method of claim 5, further comprising:
   determining, from the aggregated record data, the reopen count as a number of times that a service ticket is opened, the reopen count being attributed to the service unit resolving the ticket before the service ticket is reopened.

10. The method of claim 5, where the generating the ticket level performance scores for the plurality of service providers based on the ticket level performance metric data comprises:
    determining metric scores of a service provider for respective metrics in ticket level performance metric data based on predetermined scoring rules; and
    weighing the metric scores to obtain a ticket level performance score for the service provider.

11. The method of claim 1, where the service level performance metric data comprises service quality metric data, functional improvement metric data, cost metric data, or service-level agreement breach metric data; and the service quality metric data comprises a percentage of reopened ticket, a percentage of first call resolution, an average handling time, or an average speed of answer.

12. The method of claim 11, where the generating the service level performance scores based on the service level performance metric data comprises:
    calculating a normalized decision matrix based on the service level performance metric data of the plurality of service providers;
    weighting data in the normalized matrix to obtain a weighted normalized decision matrix;
    identifying a positive impact alternative and a negative impact alternative based on the weighted normalized decision matrix;
    calculating separate distances of service provider alternatives from the positive impact alternative and the negative impact alternative; and
    measuring, based on the separate distance, relative closeness of the service provider alternatives to the positive impact alternative as the service level performance scores of the service providers.

13. The method of claim 1, where the service feedback performance metric data comprises team availability, responsiveness, communication, or domain knowledge, and the generating service feedback performance scores for the plurality of service providers based on the service feedback metric data comprises:
    calculating a normalized decision matrix based on the service feedback metric data of the plurality of service providers;
    weighting data in the normalized matrix to obtain a weighted normalized decision matrix;
    identifying a positive impact alternative and a negative impact alternative based on the weighted normalized decision matrix;
    calculating separate distances of service provider alternatives from the positive impact alternative and the negative impact alternative; and
    measuring, based on the separate distance, relative closeness of the service provider alternatives to the positive impact alternative as the service feedback performance scores of the service providers.

14. A system, comprising:
    a memory having stored thereon executable instructions;
    a processor circuitry in communication with the memory, the processor circuitry when executing the instructions configured to:
    obtain service ticket data for service tickets processed by a plurality of service providers, each of the plurality of service providers comprising one or more service units, wherein a service ticket is transferred between service units of the plurality of service providers;
    extract service unit record data for each service unit and ticket status change record data from the service ticket data;
    aggregate the service unit record data and the ticket status change record data based on timing of transferring the service ticket between the service units;
    calculate ticket level performance metric data for the plurality of service providers based on the aggregated record data;

generate ticket level performance scores for the plurality of service providers based on the ticket level performance metric data;
obtain service level performance metric data for the plurality of service providers;
generate service level performance scores for the plurality of service providers based on the service level performance metric data;
obtain service feedback performance metric data for the plurality of service providers;
generate service feedback performance scores for the plurality of service providers based on the service feedback metric data;
merge the ticket level performance metric data, the ticket level performance scores, the service level performance metric data, the service level performance scores, the service feedback performance metric data and the service feedback performance scores to generate a set of performance vectors; and
identify a first ranking engine and a second ranking engine to be executed by the processor circuitry, the first ranking engine comprises an unsupervised machine learning model trained to evaluate overall performance of a service provider, and the second ranking engine comprises an artificial neural network model trained to evaluate overall performance of a service provider;
compare evaluation accuracy of the first ranking engine with evaluation accuracy of the second ranking engine;
select an executing ranking engine from the first ranking engine and the second ranking engine based on a result of the comparison;
input the set of performance vectors into the executing ranking engine executed by the processor circuitry to evaluate overall performance of the plurality of service providers; and
display evaluation results of the overall performance of the plurality of service providers via a user interface;
in response to the first ranking engine being selected as the executing ranking engine, train the artificial neural network model in the second ranking engine with the evaluation results as training data.

15. The system of claim 14, where in response to the first ranking engine being selected as the executing ranking engine, the processor circuitry when executing the instructions is configured to:
predict weights of performance metrics in the ticket level performance metric data, the service level performance metric data, and the service feedback performance metric data by executing a multi-criteria decision making model;
generate overall performance scores for the plurality of service providers based on the weights of the performance metrics and the set of performance vectors by executing the multi- criteria decision making model; and
classify the plurality of service providers based on the overall performance scores by executing the unsupervised machine learning model.

16. The system of claim 15, where in response to the second ranking engine being selected as the executing ranking engine, the processor circuitry when executing the instructions is configured to:
classify the plurality of service providers based on the set of performance vectors by executing the artificial neural network model.

17. A product, comprising:
machine-readable media other than a transitory signal; and
instructions stored on the machine-readable media, the instructions configured to, when executed, cause a processor circuitry to:
obtain service ticket data for service tickets processed by a plurality of service providers, each of the plurality of service providers comprising one or more service units, wherein a service ticket is transferred between service units of the plurality of service providers;
extract service unit record data for each service unit and ticket status change record data from the service ticket data;
aggregate the service unit record data and the ticket status change record data based on timing of transferring the service ticket between the service units;
calculate ticket level performance metric data for the plurality of service providers based on the aggregated record data;
generate ticket level performance scores for the plurality of service providers based on the ticket level performance metric data;
obtain service level performance metric data for the plurality of service providers;
generate service level performance scores for the plurality of service providers based on the service level performance metric data;
obtain service feedback performance metric data for the plurality of service providers;
generate service feedback performance scores for the plurality of service providers based on the service feedback metric data;
merge the ticket level performance metric data, the ticket level performance scores, the service level performance metric data, the service level performance scores, the service feedback performance metric data and the service feedback performance scores to generate a set of performance vectors; and
identify a first ranking engine and a second ranking engine to be executed by the processor circuitry, the first ranking engine comprises an unsupervised machine learning model trained to evaluate overall performance of a service provider, and the second ranking engine comprises an artificial neural network model trained to evaluate overall performance of a service provider;
compare evaluation accuracy of the first ranking engine with evaluation accuracy of the second ranking engine;
select an executing ranking engine from the first ranking engine and the second ranking engine based on a result of the comparison;
input the set of performance vectors into the executing ranking engine executed by the processor circuitry to evaluate overall performance of the plurality of service providers; and
display evaluation results of the overall performance of the plurality of service providers via a user interface;
in response to the first ranking engine being selected as the executing ranking engine, train the artificial neural network model in the second ranking engine with the evaluation results as training data.

* * * * *